United States Patent
Andoh et al.

[11] Patent Number: 5,841,035
[45] Date of Patent: Nov. 24, 1998

[54] VORTEX FLOWMETER

[75] Inventors: Tetsuo Andoh; Yoshinori Matsunaga; Takashi Kawano; Masanori Hondo; Masami Wada; Kazuo Nagata, all of Tokyo, Japan

[73] Assignee: Yokogawa Electric Corporation, Tokyo, Japan

[21] Appl. No.: 828,874

[22] Filed: Mar. 31, 1997

[30] Foreign Application Priority Data

Apr. 2, 1996 [JP] Japan ................................. 8-080094
Jul. 3, 1996 [JP] Japan ................................. 8-173123

[51] Int. Cl.$^6$ ........................................................ G01F 1/32
[52] U.S. Cl. ........................................................... 73/861.22
[58] Field of Search ............................. 73/861.22, 861.23, 73/861.24; 327/552

[56] References Cited

U.S. PATENT DOCUMENTS 4,123,940 11/1978 Herzl ............................................ 73/194
5,005,427 4/1991 Ohmae ..................................... 73/861.22
5,309,771 5/1994 Lew et al. ................................ 73/861.22

Primary Examiner—George M. Dombroske
Assistant Examiner—Jewel Thompson
Attorney, Agent, or Firm—Moonray Kojima

[57] ABSTRACT

A vortex flowmeter for calculating the flow rate of a measuring fluid flowing through a flow path using ultrasonic signals subjected to changes in the propagation time due to Karman vortices, comprising a reference signal generating device for outputting a plurality of reference signals of different phases; a signal analyzing device for outputting an input status signal by determining the relationship between the phases of the ultrasonic signals and each reference signal; a plurality of phase detectors for outputting phase signals by detecting the phase difference between the ultrasonic signals and the reference signals; and a channel selector for selecting the optimum phase signal using the input status signal and for outputting the optimum phase signal as a selection signal, wherein the flow rate signals are computed and outputted using the selected phase signal. The vortices are thus stably detected even when a phase change due to the vortices in the vortex flowmeter is large.

19 Claims, 29 Drawing Sheets

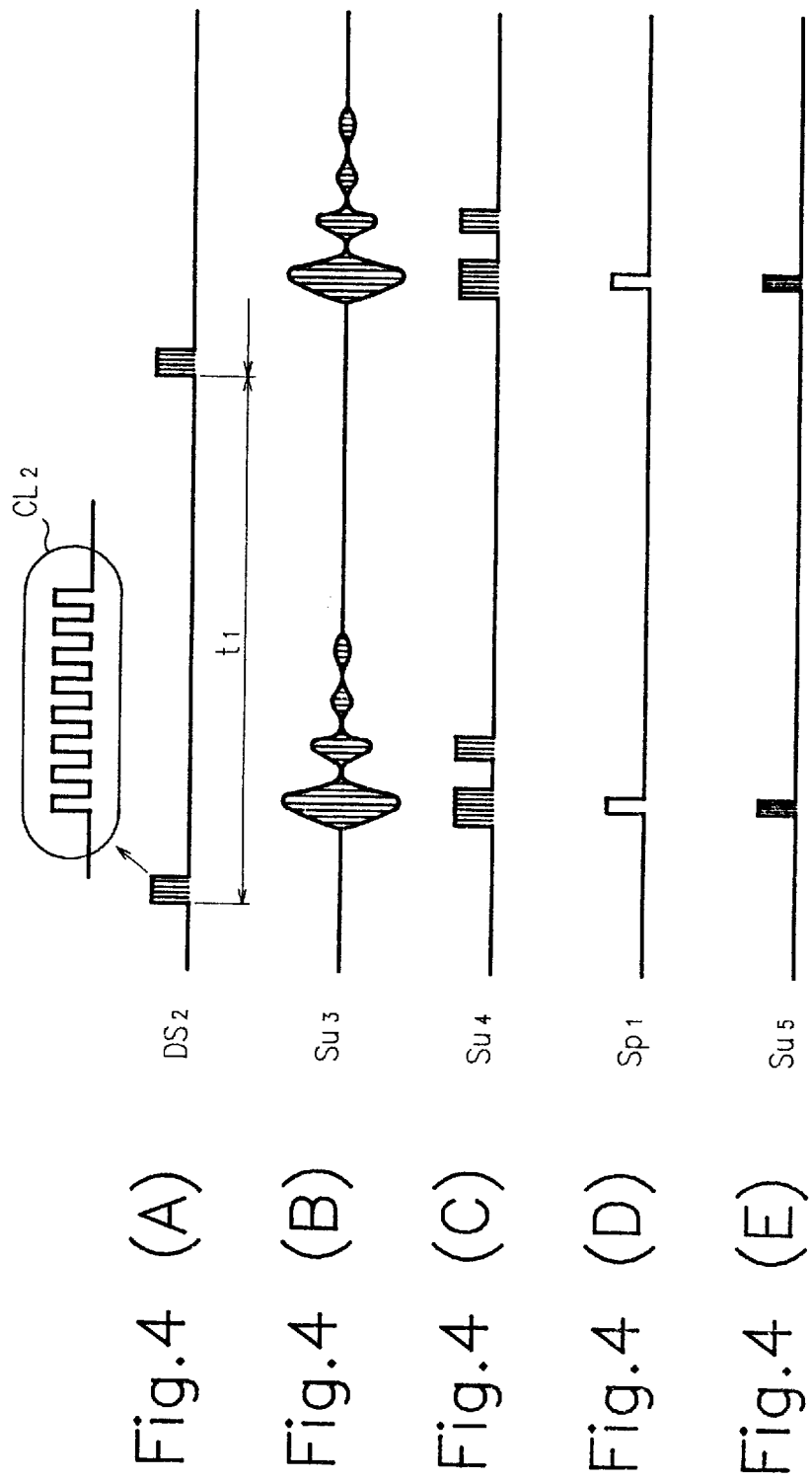

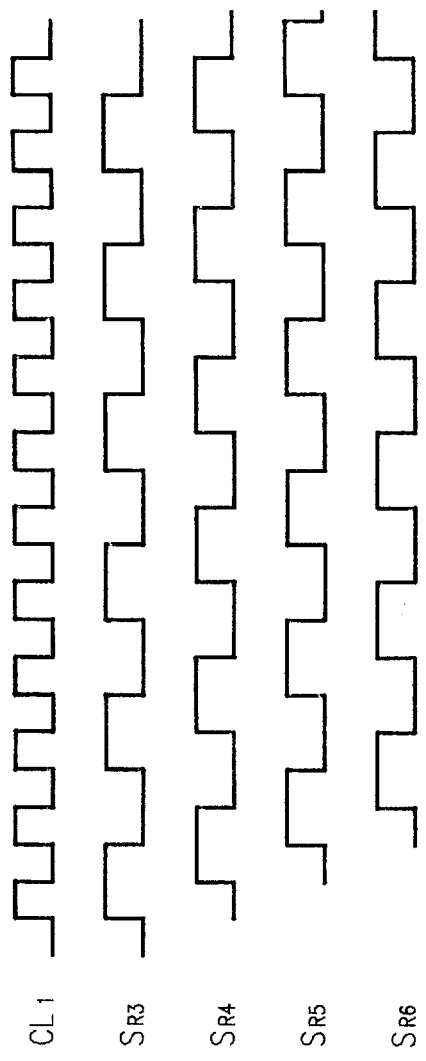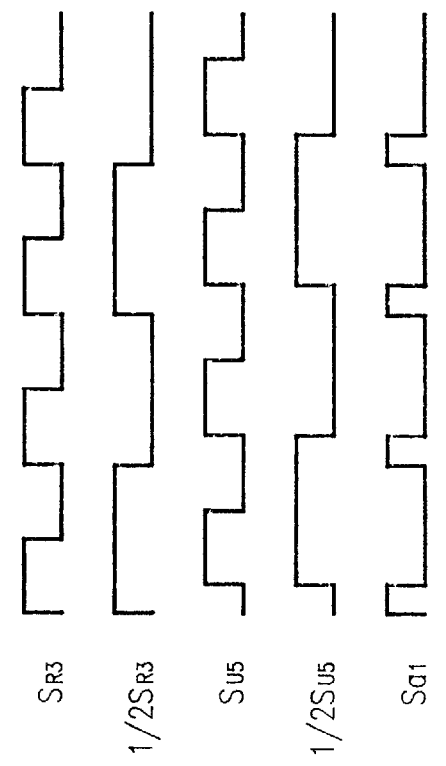

Fig.19 (A) DS2'
Fig.19 (B) Su3'
Fig.19 (C) Sp1'

Fig. 21
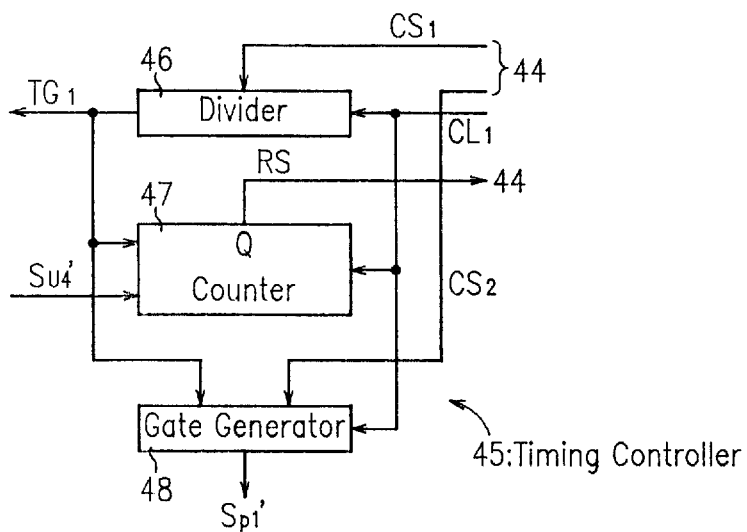
Fig. 22 (A) TG₁ 
Fig. 22 (B) DS₂ 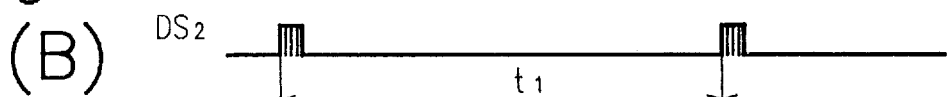
Fig. 22 (C) Su₄' 
Fig. 22 (D) Sp₁' 

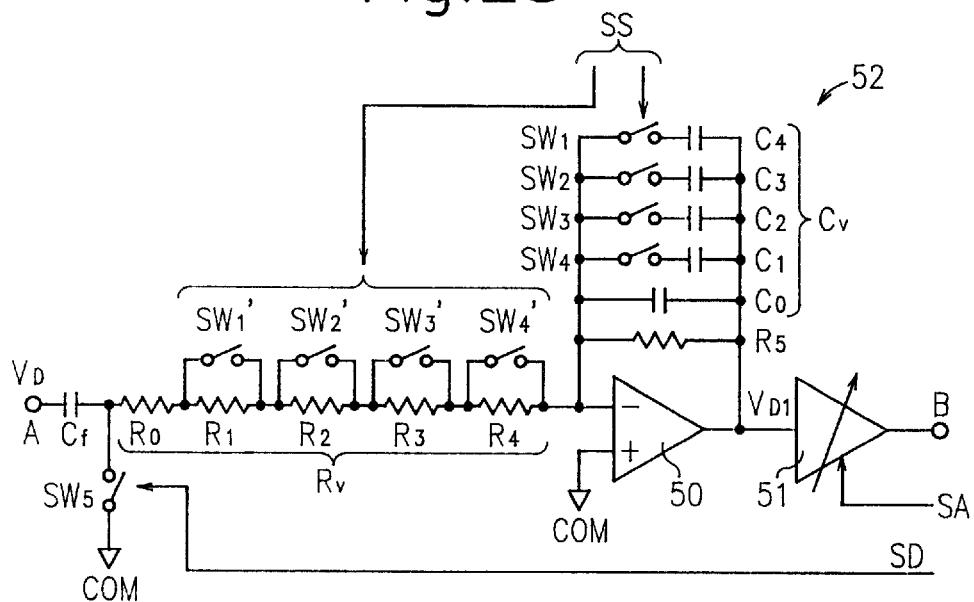
Fig. 28
Fig. 29 (A)   $V_D$
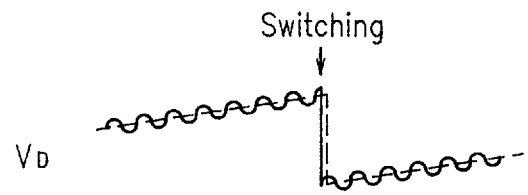
Fig. 29 (B)   $V_{DO}$
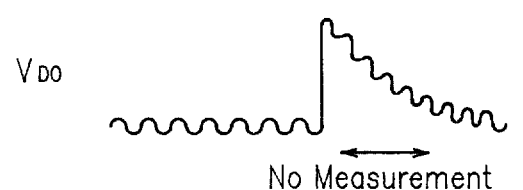
Fig. 29 (C)   $V_{D1}$
Fig. 29 (D)   SD

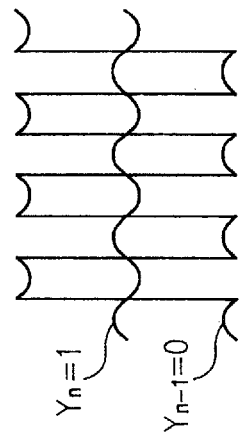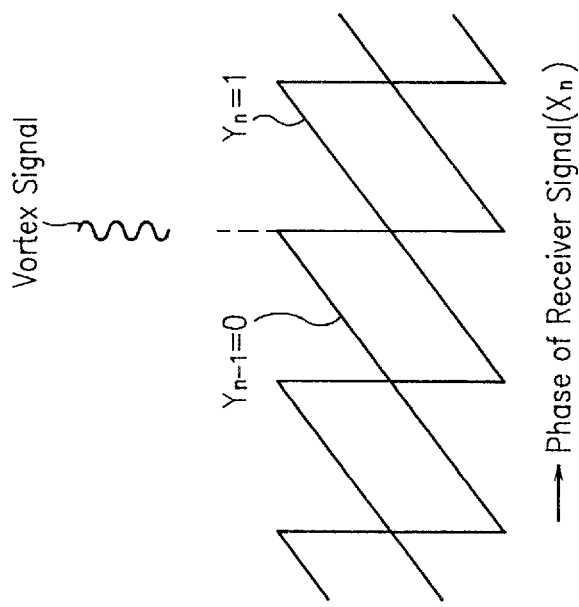
Fig.30 (A) Fig.30 (B)

VORTEX FLOWMETER

BACKGROUND OF THE INVENTION

1. Field of Invention

This invention relates to a vortex flowmeter of the type which calculates the flow rate of a measuring fluid through a flow path using ultrasonic signals whose propagation time is changed with Karman vortices; and more particularly, to such a flowmeter which is improved so that vortices can be detected in a stable manner even when phase changes due to the vortices are large.

2. Description of the Prior Art

FIG. 1 shows a prior art vortex flowmeter of the type which calculates the flow rate of a measuring fluid by detecting changes in the propagation time obtained by using continuous ultrasonic waves applied to the vortices.

A reference clock $CL_1$ is transmitted from clock generator 10 to driver 11, which then transmits a drive signal $DS_1$, of a higher frequency than the Karman vortex frequency, and in synchronization with the reference clock $CL_1$, to ultrasonic transmitter 12. Transmitter 12 is located on the downstream side of vortex shedder 14, and is fixed to the wall of metering pipe 13 and is disposed to be perpendicular to both vortex shedder 14 and to the axis of the pipe 13. Ultrasonic receiver 15 is fixed to the wall of pipe 13 opposite ultrasonic transmitter 12. The transmitter may comprise a piezoelectric element.

Drive signal $DS_1$ causes transmitter 12 to supply ultrasonic waves into the measuring fluid flowing in pipe 13. The ultrasonic waves are modulated by the velocity component of the Karman vortex in the direction connecting the transmitter 12 and the receiver 15 and are received by receiver 15. Then, the modulated ultrasonic waves are outputted as ultrasonic signals $S_{u1}$ to amplifier 16. Signals $S_{u1}$ are further outputted to pulse shaper 17 which converts the signals $S_{u1}$ to ultrasonic pulse signals $S_{u2}$ and supplies such pulses to Phase detector 18.

Concurrently, clock generator 10 applies reference clock $CL_1$ to reference generator 19, and in synchronization with the clock signal, reference signals $S_{R1}$ are outputted from reference generator 19 to phase detector 18. Thus, phase detector 18 performs a phase sensitive detection of ultrasonic signals $S_{u2}$, taking reference signals $S_{R1}$ as a reference, and outputs the detected signals to filter 20. Filter 20 then outputs filtered signals to Schmitt trigger 21 and to phase shifter 22. Phase shifter 22 controls reference generator 19 so that the generator 19 outputs reference signal $S_{R1}$, whose phases are shifted by ¶ depending on the initial phase value, to phase detector 18.

Schmitt trigger 21 outputs the vortex waveforms which are reproduced from the Karman vortices obtained at the output terminal of filter 20 to output terminal 23 with a predetermined threshold value as a reference.

The foregoing circuitry is explained in greater detail using numerical, expressions. The propagation time "T" of ultrasonic signals $S_{u1}$ is expressed as a function of time "t", as follows:

$$T=D/[C-V_v \sin (2\pi f_v \cdot t)] \quad (1)$$

wherein C is the velocity of sound in the measuring fluid, $V_v$ is the velocity of the vortex circulation flow, $f_v$ is the vortex frequency, and D is the size of the diameter of the metering pipe 13.

Also, if the frequency of the ultrasonic signals $S_{u1}$ is $f_s$, then phase $\Phi$ between ultrasonic signals $S_{u1}$ and reference signals $S_{R1}$ is as follows:

$$\begin{aligned}\Phi &= 2\pi f_s D/[C - v_v \sin(2\pi f_v \cdot t)] \quad (2)\\ &= 2\pi f_s D/C + 2\pi f_s DV_v \sin(2\pi f_v \cdot t)/C^2\end{aligned}$$

In equation (2), the first term represents the initial phase and the second term represents the phase shift due to the vortices. Although the initial phase changes because sound velocity C varies due to the temperature changes in the measuring fluid, since the phase shift is very slow as compared with that due to the vortices, it may be considered to be approximately constant. For this reason, the shift in phase $\Phi$ can be measured with phase detector 18. Thus, the vortices can be reproduced by filter 20.

In that case, since the phase change due to the vortices, even if it is small, readily exceeds the processing range of the phase detector 18 when the initial phase is in the vicinity of 0 or 2¶, the reference signals are switched in phase shifter 22 to other reference signals whose phase is different by ¶ from the present reference signals by a constant initial phase value to bring it into the processing range of phase detector 18.

Since the vortices are reproduced in an analog manner by the output from filter 20, when the phase change due to the vortices is small, vortex pulse signals can be reproduced at output terminal 23 by converting the output from filter 20 to pulses using Schmitt trigger 21.

FIG. 2 shows another prior art vortex flowmeter of the type which calculates the flow rate of the measuring fluid by detecting changes in the propagation time obtained by applying to the vortices ultrasonic waves as intermittent burst waves. In the following description, the same parts having the same functions as in FIG. 1 will be provided the same numbers and will not be further described hereat for sake of clarity.

Clock generator 10 outputs reference clock $CL_1$ to driver 24 and timing controller 25A, respectively. Timing controller 25A outputs timing signals $TG_1$ to driver 24 which causes driver 24 to transmit ultrasonic waves as intermittent bursts. In addition, timing controller 25A transmits timings signals $S_{P2}$ to sample/hold circuit 30 and the sampling signal $S_{P1}$ to sampler 27. Driver 24 under control by timing signals $TG_1$ applies drive signals $DS_2$, in the form of bursts, to transmitter 12. The drive signals $DS_2$ cause the piezo electric element of the transmitter 12 to convert the signals to strain and transmits the ultrasonic waves into the measuring fluid. Drive signals $DS_2$ are intermittent bursts with a repetition cycle of bursts being set to be shorter than the vortex generation cycle due to the the necessity of restoring the vortex signals.

Transmitter 12 supplies ultrasonic waves inside metering pipe 13. The ultrasonic waves are subjected to phase modulation by the Karman vortices. After such modulation, the waves are received by receiver 15. Then, the received signals are outputted to amplifier 16 as ultrasonic signals $S_{U3}$. Ultrasonic signals $S_{U3}$ are converted by pulse shaper 26 to pulses using a predetermined threshold as a reference and then outputted to sampler 27 as pulsed ultrasonic signals $S_{U4}$.

The sampling signal $S_{P1}$ is repeatedly delayed for a predetermined time so as to be sent as a burst from timing controller 25A. Using sampling signals $S_{P1}$, ultrasonic signal $S_{U4}$ is sampled each time by sampler 27 and outputted to phase detector 28.

Concurrently, reference clock $CL_1$ is applied by clock generator 10 to reference generator 29 which outputs reference signal $S_{R2}$ to phase detector 28 after being delayed for a predetermined time so as to be sent as bursts. Then, phase detector 28 carries out phase sensitive detection on the ultrasonic signals outputted by sampler 27 using reference signals $S_{R2}$ as a base, and then outputs the ultrasonic signals to sample/hold circuit 30. Sample/hold circuit 30 samples the output of phase detector 28 using sampling signals $S_{P2}$ obtained from timing controller 25 and outputs the signals to filter 31.

Filter 31 transmits the filtered signals to Schmitt trigger 21 and to phase shifter 22. Phase shifter 22 controls reference generator 29 so that the generator outputs reference signal $S_{R2}$ whose phase is different from the other reference signal by ¶ depending on the initial phase value of signal applied to phase detector 28.

Schmitt trigger 21 outputs vortex waves, which reproduce Karman vortices obtained at the output terminal of filter 31, to output terminal 23 as pulse waves using a predetermined threshold as a reference.

The FIG. 2 circuit uses burst waves to restore the vortices. Thus, this configuration has the advantage of being able to separate and reject noise that reaches receiver 15 via metallic metering pipe 13. That is, by sending and receiving ultrasonic waves intermittently instead of continuously, as in FIG. 1, the vortices are restored more effectively.

In the foregoing cases of restoring vortices using a continuous wave (FIG. 1) or using intermittent burst waves (FIG. 2), the restoration functions effectively only when the ultrasonic wave phase changes, due to the vortices, are small. However, for example, if the size of the pipe is larger, the flow velocity is faster, or the sound velocity is slower, ultrasonic wave phase changes due to the vortices readily exceed the 0 to 2¶ range and the prior art systems of FIGS. 1 and 2 become inoperable.

If the initial phase is in the vicinity of 0 or 2¶, since the phase change due to the vortices, even if small, readily exceeds the processing range of the phase detector, phase shifter 22 is provided to avoid exceeding the range. However, since such phase shifter 22 only s-witches reference signals whose phases are different by ¶ depending on the constant value of the initial phase, the phase shifter 22 does not function for an AC-like phase change due to the vortices and does not solve the problems caused by large phase changes.

The foregoing faults may be reduced by lowering the ultrasonic frequency. However, in that case, a problem occurs where ultrasonic wave absorption and scattering increases when air bubbles contained in the measuring fluid pass by the flowmeter. Thus, the ultrasonic waves will not reach the ultrasonic receiver and other errors occur.

SUMMARY OF THE INVENTION

An object of the invention is to overcome the aforementioned and other disadvantages and deficiencies of the prior art.

The foregoing and other objects are attained in the invention which encompasses a vortex flowmeter which is configured to calculate the flow rate of a measuring fluid flowing through a flow path using ultrasonic signals subjected to change in propagation time due to Karman vortices, wherein reference signal generating means output a plurality of reference signals of different phases, signal analyzing means output an input status signal by determining the relationship between the phases of the ultrasonic signals and each reference signal, a plurality of phase detection means output phase signals by detecting phase differences between the ultrasonic signals and the reference signals, and channel selection means select an optimum phase signal using the input status signals and output same as a selected signal, and compute and output flow rate signals using the selected phase signal.

BRIEF DESCRIPTION OF THE DRAWINGS

FIGS. 4(A)–4(E) are waveform diagrams depicting signal sampling in the embodiment of FIG. 3.

FIGS. 5(A–5(E) are waveform diagrams depicting reference signals in the embodiment of FIG. 3.

FIGS. 6(A)–6(E) are waveform diagrams depicting phase signals in the embodiment of FIG. 3.

FIGS. 19(A)–19(C) are waveform diagrams obtained when ultra-sonic waves are received in different forms from the embodiment of FIG. 3.

FIG. 21 is a circuit diagram depicting details of the timing controller of FIG. 20.

FIGS. 22(A)–22(D) are timing diagrams depicting operation of the embodiment of FIG. 20.

FIG. 28 is a circuit diagram depicting details of a filter obtained by improving the filter of FIG. 24.

FIGS. 29(A)–29(D) are waveform diagrams depicting operation of the filter of FIG. 28.

FIGS. 30(A) and 30(B) are waveform diagrams depicting examples of problems generated by a special circumstance in the embodiment of FIG. 20.

FIG. 26 is a characteristic diagram depicting operation of the filter of FIG. 35.

DESCRIPTION OF THE PREFERRED EMBODIMENTS

Figure 1:
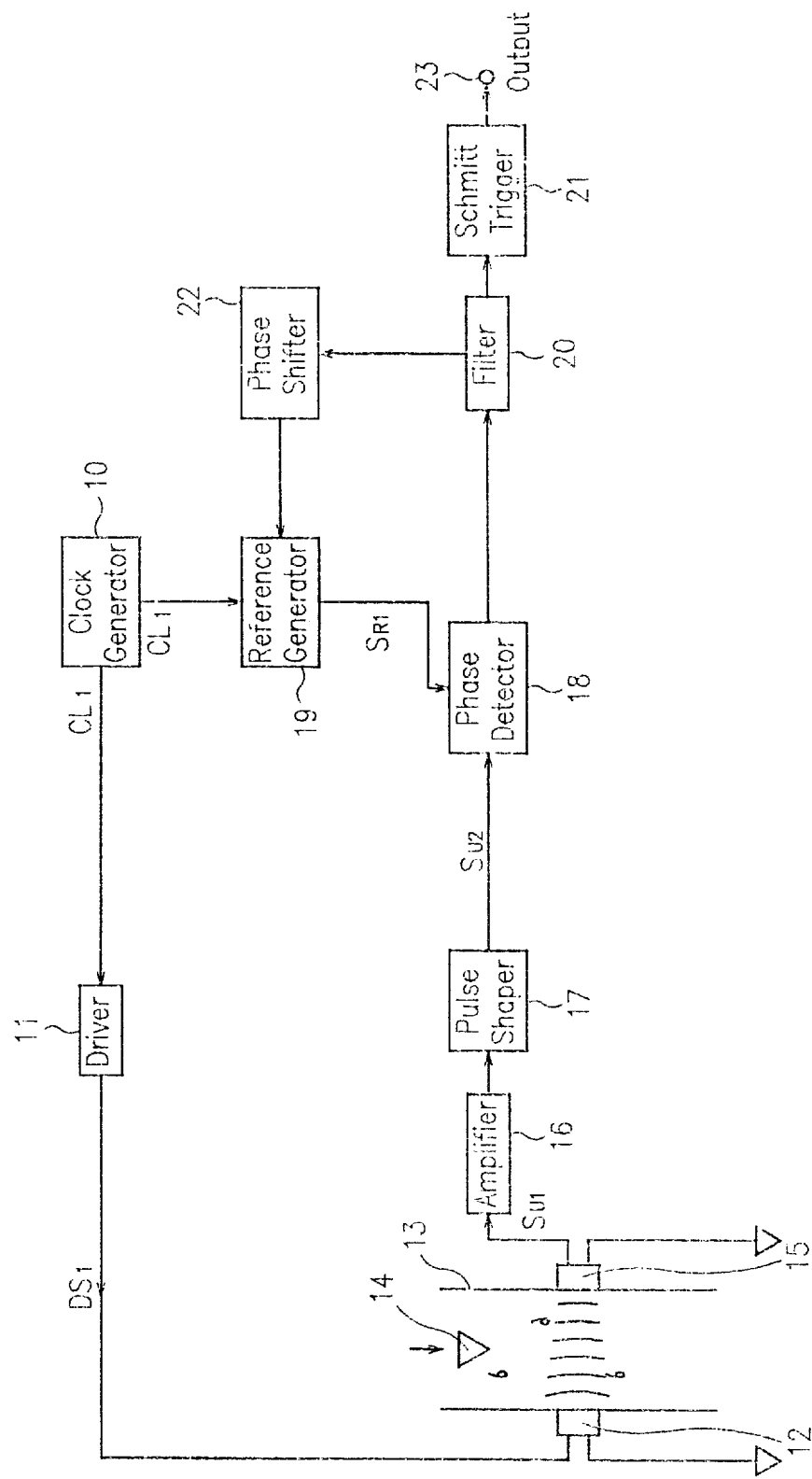
FIG. 1 is a block diagram depicting a prior art vortex flowmeter using continuous waves.
Figure 2:
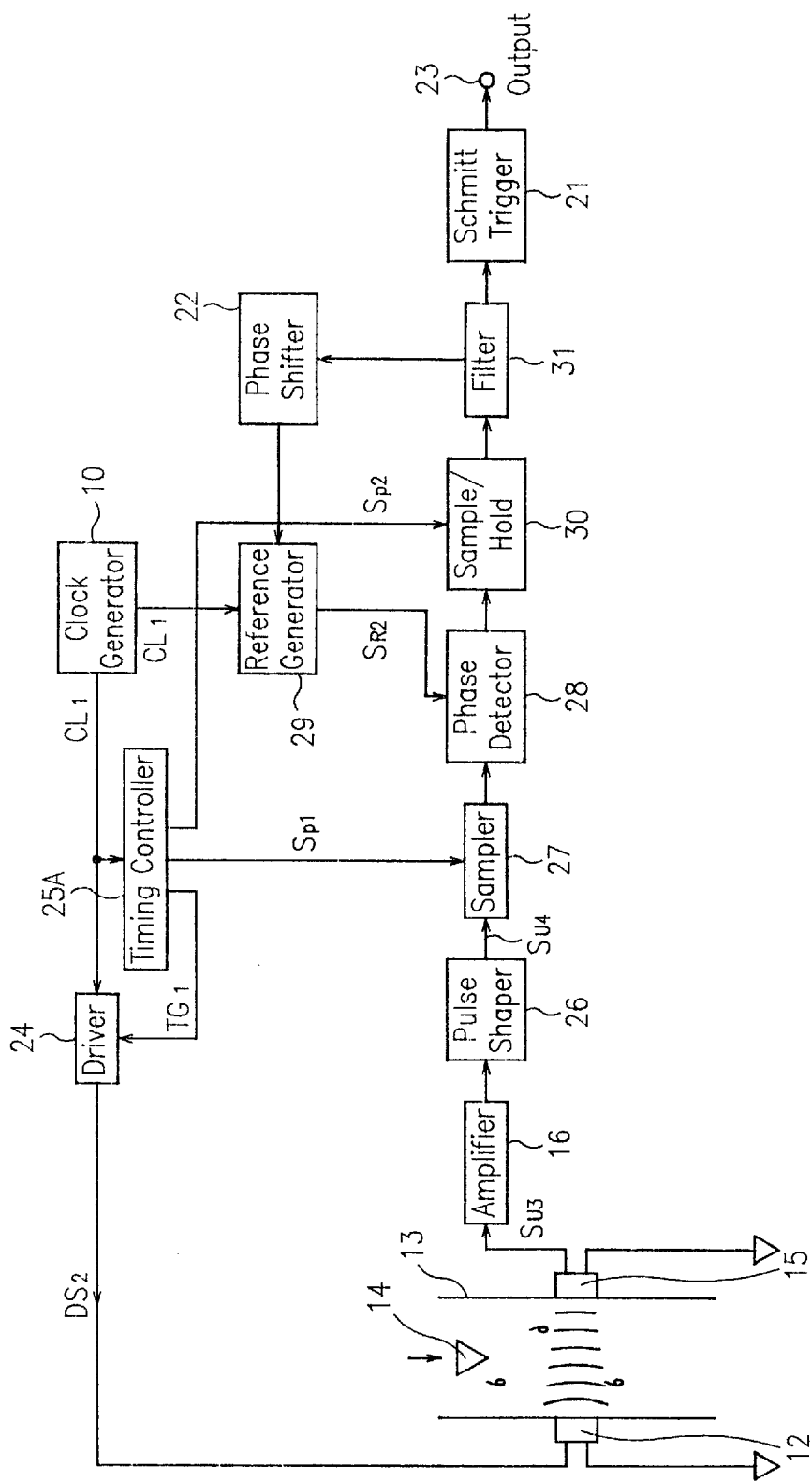
FIG. 2 is a block diagram depicting another prior art vortex flowmeter using intermittent burst waves.
Figure 3:
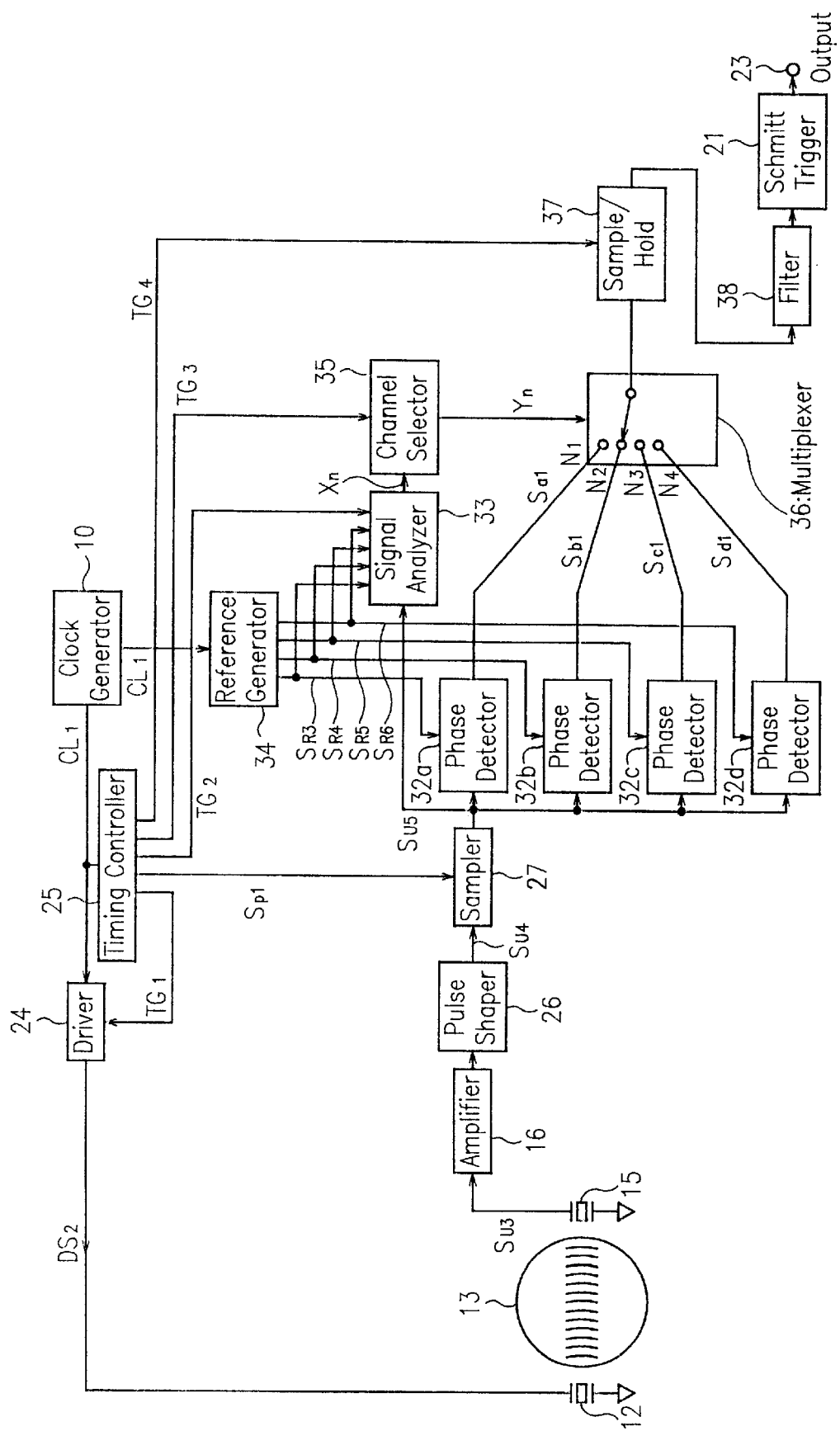
FIG. 3 is a block diagram depicting a first illustrative embodiment of the invention.

Turning now to FIG. 3, the parts having the same functions as in FIGS. 1 and 2 are provided the same reference numbers and a description thereof is omitted hereat for sake of clarity. Clock generator 10 outputs reference clock $CL_1$ to driver 24 and timing controller 25, respectively. Timing controller 25 output timing signals $TG_1$ to driver 24 to cause driver 24 to output burst waves. Timing controller 25 also outputs timing signals to other circuits, e.g. timing signal $TG_2$ to signal analyzer 33 for an input decision, timing signal $TG_3$ to channel selector 35 for channel selection and timing signal $TG_4$ to sample/hold circuit 37 for sample and hold, and sample signal $S_{P1}$ to sampler 27 for sampling.

Driver 24 applies drive signals $DS_2$ to ultrasonic transmitter 12 in the form of intermittent burst waves controlled by timing signals $TG_1$. The piezo electric element of transmitter 12 converts the drive signals $DS_1$ into ultrasonic strain waves which are applied to the measuring fluid.

Although in FIG. 3 the metering pipe 13, transmitter 12 and receiver 15 are shown from a cross sectional view and differs slightly from the device shown in FIG. 1, both devices are similar except where the difference are described herein.

Ultrasonic waves produced by transmitter 12 are directed toward the Karman vortices in the measuring fluid and are received by the receiver 15, and then outputted thereby to amplifier 16 as ultrasonic signals $S_{U3}$. The amplified signals $S_{U3}$ are outputted to pulse shaper 26 which converts the signal to rectangular pulses which are outputted to sampler 27. The pulse shaper 26 produces the rectangular pulse by using a predetermined threshold as a reference. Sampler 27 cuts out part of the ultrasonic signals $S_{U4}$ at the time sampling signal $S_{P1}$ is received from timing controller 25, and outputs the resulting signal as ultrasonic signal $S_{U5}$ to phase detectors 32a, 32b, 32c and 32d and to signal analyzer 33.

Reference generator 34 generates four reference signals $S_{R3}, S_{R4}, S_{R5}$, and $S_{R6}$, whose phases are shifted by $\P/2$ in turn by dividing the frequency of the reference clock $CL_1$, outputted from clock generator 10.

Phase detector 32a detects the phase of ultrasonic signals $S_{U5}$ using reference signal $S_{R3}$ having phase 0. Phase detector 32b detects the phase of signal $S_{U5}$ using reference signal $S_{R4}$ having phase $\P/2$. Phase detector 32c detects the phase of signal $S_{U5}$ using reference signal $S_{R6}$ having phase $3\P/2$. The phase detectors 32a–32d output pulse width phase signals $S_{a1}, S_{b1}, S_{c1}$, and $S_{d1}$ respectively.

Signal analyzer 33 receives timing signal $TG_2$, ultrasonic signal $S_{U5}$, and reference signals $S_{R3}$–$S_{R6}$, and determines the phase relationship of ultrasonic signals $S_{U5}$ to reference signals $S_{R3}$–$S_{R6}$, and outputs to channel selector 35 the input status signal as phase pattern signal $X_n$.

Channel selector 35 receives timing signal $TG_3$ and phase pattern signal $X_n$, and selects an optimum phase signal from what would be among phase signals $S_{a1}, S_{b1}, S_{c1}$, and $S_{d1}$, based on phase pattern signal $X_n$, and outputs the optimum phase signal as selection signal $Y_n$. Multiplexer 36 selects one of the switches $N_1, N_2, N_3$ and $N_4$ corresponding to phase signals $S_{a1}, S_{b1}, S_{c1}$, and $S_{d1}$ using selection signal $Y_n$, and outputs the selected signal to sample/hold circuit 37.

Sample/hold circuit 37 suitably samples and holds the phase signal selected by timing signal $tG_4$ outputted from timing controller 25 until the next phase signal processing starts. Filter 30 restores the vortex signals by processing the waveforms of the sample held phase signal and the restored vortex signals are converted to pulses at a predetermined threshold level in Schmitt trigger circuit 21 and outputted to output terminal 23.

Next, an overview of the entire operation of the embodiment of FIG. 3 will be described with reference to the waveform diagrams of FIGS. 4(A)–4(E). FIG. 4(A) shows the waveform of drive signal $DS_2$ applied to transmitter 12 by driver 24. Driver 24 controls the repetition cycle $t_1$ of the drive signal $DS_2$ burst waves by timing signal $TG_1$ and also creates clock $CL_2$ obtained by frequency dividing reference clock $CL_1$ by one half. The burst wave repetition cycle $t_1$ is set to be shorter than the vortex generation cycle due to the necessity of restoring the vortex signals, and clock $CL_2$ is used as a clock frequency divided into half of reference clock $CL_1$ for the reason of generating reference signals.

Transmitter 12 receives the drive signal $DS_2$ and supplies ultrasonic waves to the measuring fluid. The ultrasonic waves are then phase modulated with Karman vortices shed in the measuring fluid and are then received by receiver 15, and are outputted by receiver 15 to amplifier 16 as ultrasonic signal $S_{U3}$ (see FIG. 4(B)). The waveform of signal $S_{U3}$ includes superimposed waveforms, such as those reflected a plurality of times by pipe 13 and/or reverberation waves, in addition to the main waveform capturing the Karman vortices. Ultrasonic signals $S_{U3}$ outputted via amplifier 16 are supplied to pulse shaper 26, converted to rectangular waves by a predetermined reference threshold, and outputted to sampler 27 as ultrasonic signal $S_{U4}$ (see FIG. 4(C)).

Sampling signals $S_{P1}$ (see FIG. 4(D)) are outputted to sampler 27 at a predetermined timing from timing controller 25 and sampler 27 samples the ultrasonic signals $S_{U4}$ using sampling signals $S_{P1}$ and outputs the signals as ultrasonic signals $S_{U5}$ (see FIG. 4(E)). Concurrently, reference generator 34, based on reference signal $S_{R3}$ (see FIG. 5(B)) of phase 0, which is a clock signal obtained by frequency dividing the reference clock $CL_1$ (see FIG. 5(A)) by one half, generates reference signal $S_{r4}$ of phase $\P/2$ (see FIG. 5(C)), reference signal $S_{R5}$ of phase $\P$ (see FIG. 5(D)) and reference signal $S_{R6}$ of phase $3\P/2$ (see FIG. 5(E)), respectively, by shifting the phase of signal $S_{R3}$ by $\P/2$ in turn.

Reference signals $S_{r3}, S_{R4}, S_{R5}$, and $S_{R6}$ are applied to phase detectors 32a, 32b, 32c, and 32d, respectively by reference generator 34. Since each phase detector operates similarly and being different only in phase shifted by ¶/2 in turn from the reference signal $S_{r3}$ for Phase 0, the signal processing of reference signal $S_{R3}$ in phase detector 32a will be described with reference to the waveform diagrams of FIGS. 6(A)–6(E).

Phase detector 32a generates reference signal (½) $S_{R3}$ (see FIG. 6(B)) obtained by frequency dividing reference signal $S_{R3}$ of phase 0 (see FIG. 6(A)) by one half shown in FIG. 5(B), and ultrasonic signal (½) $S_{U5}$ (see FIG. 6(D)) obtained by frequency dividing ultrasonic signals $S_{U5}$ (see FIG. 6(C)) outputted by sampler 27. In addition, phase detector 32a computes the exclusive OR of reference signal (½) $S_{R3}$ and ultrasonic signal (½) $S_{U5}$ and outputs the computed result to multiplexer 36 as pulse width modulated phase signal $S_{a1}$ (see FIG. 6(E)).

Figure 7:
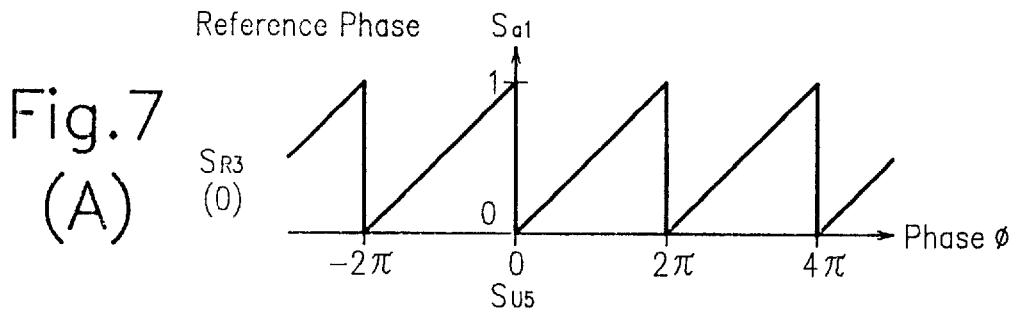
FIGS. 7(A)–7(D) are waveform diagrams depicting input-output characteristics of the phase detectors of FIG. 3.
Figure 7:
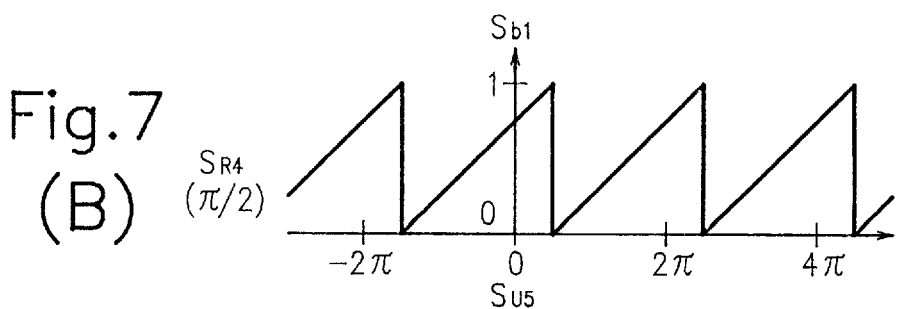
Figure 7:
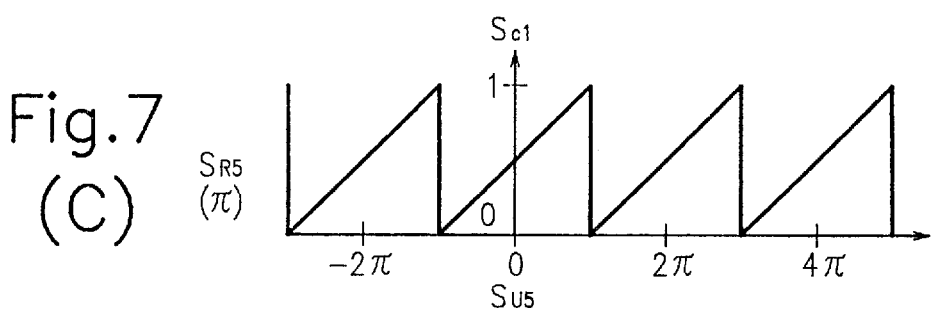
Figure 7:
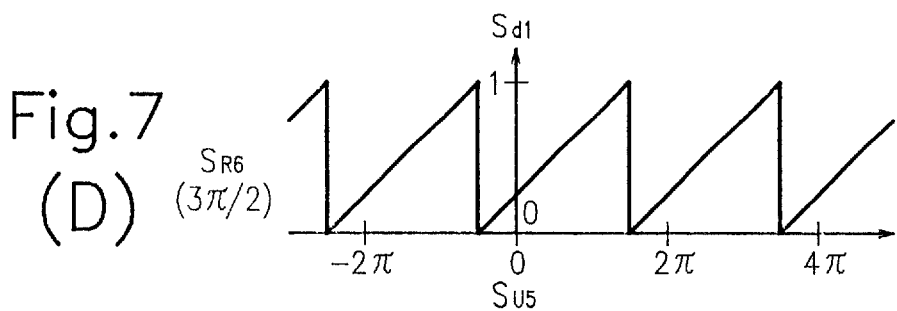

The input/output characteristic of phase detector 32a, in this case for the reference signal $S_{R3}$ of phase 0, is as shown in FIG. 7(A), corresponding to the phase of signal $S_{U5}$. In FIG. 7(A) the horizontal axis shows the phase of signal $S_{U5}$ and the vertical axis shows the phase signal $S_{a1}$. The pulse width changes corresponding to the phase of signal $S_{U5}$ to reference signal $S_{R3}$ and phase signal $S_{a1}$ (see FIG. 6(E)) changes to a sawtooth shape.

In a similar manner, FIG. 7(B) shows the case of reference signal $S_{R4}$ of phase ¶/2 and the horizontal axis shows the phase of signal $S_{U5}$ and the vertical axis shows phase signal $S_{b1}$ FIG. 7(C) represents the case of reference signal $S_{R5}$ of phase ¶ and the horizontal axis shows the phase of reference signal $S_{U5}$ and the vertical axis shows the phase signal $S_{c1}$. FIG. 7(D) represents the case of reference signal $S_{R6}$ of phase 3¶/2 and the horizontal axis shows the phase of reference signal $S_{U5}$ and the vertical axis shows the phase signal $S_{d1}$.

Since the phases of reference signals $S_{R3}$, $S_{R4}$, $S_{R5}$ and $S_{R6}$ are different by ¶/2, in turn, respectively, the levels of the output phase signals $S_{a1}$, $S_{b1}$, $S_{c1}$, and $S_{d1}$ are also different by 0.25 (which corresponds to ¶/2), in turn, respectively to the phase of the same ultrasonic signal $S_{U5}$. Next, by taking phase signals $S_{a1}$, $S_{b1}$, $S_{c1}$, and $S_{d1}$, obtained in the above manner as bases, operations subsequent to the multiplexer 36 will be described with reference to the waveform diagrams of FIGS. 8(A)–8(C) and FIGS. 9(A)–9(G). For simplicity, operation by multiplexer 36 fixed to an optimum one of the phase detectors 32a–32d, will be described. The detailed configuration and operation which involves selection of an optimum position of multiplexer 36 will be described later.

Figure 8:
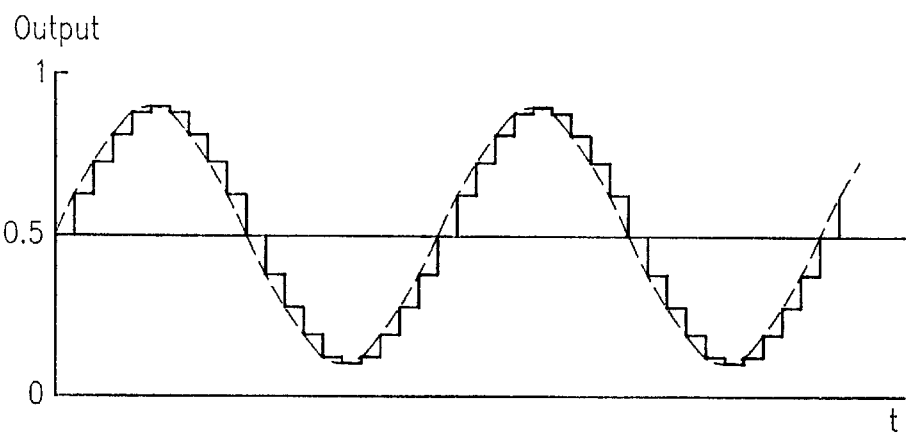
FIGS. 8(A)–8(C) are waveform diagrams depicting signal processing in the embodiment of FIG. 3 when a phase change due to the vortices is small.
Figure 8:
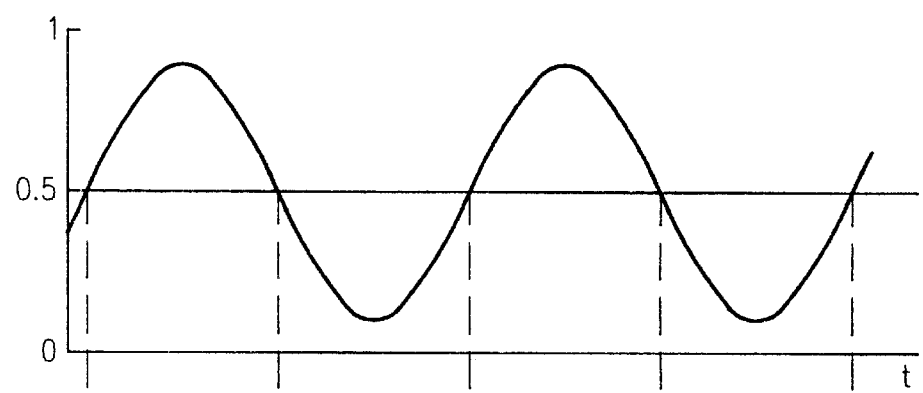
Figure 8:
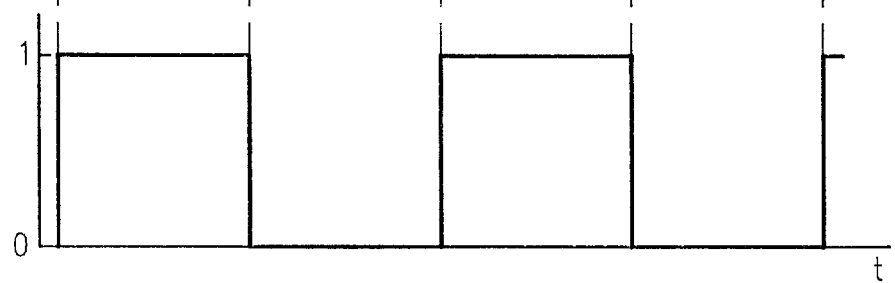

First, the case of a small phase change (e.g. 2¶ or less) due to vortices will be described with reference to the waveform diagrams of FIGS. 8(A)–8(C). FIG. 8(A) shows the output waveform of sample/hold circuit 37. Sample/hold circuit 37 acquires the pulse width of the optimum phase signal selected by multiplexer 36 from phase signals $S_{a1}$, $S_{b1}$, $S_{c1}$, and $S_{d1}$ outputted from phase detectors 32a–32d respectively, using timing signal $TG_4$, smoothes the optimum phase signal, and then holds the optimum phase signal for each sampling cycle and restores the vortex signals as step-wise waveforms, such as shown in FIG. 8(A). The original vortex signals are those represented by a broken line. The waveforms corresponding to the vortex signals are then reproduced by smoothing the step wise waveforms using filter 38 (see FIG. 8(B)). Schmitt trigger 21 converts the reproduced sine wave to a rectangular wave with 0.5 (see FIG. 8(B)) as the threshold value (see FIG. 8(C)) and outputs the signal to output terminal 23.

Next, the case of a large phase change (e.g. 2¶ or more) due to the vortices will be described with reference to the waveform diagrams of FIGS. 9(A)–9(G). The phase change in this example is 0 to 3¶ (with the initial phase being 3¶/2). FIGS. 9(R)–9(D) show waveforms of output phase signals $S_{a1}'$, $S_{b1}'$, $S_{c1}'$, and $S_{d1}'$ outputted from phase detectors 32a–32d, respectively, which are connected to each corresponding fixed position of multiplexer 36, respectively.

Since phase signals $S_{a1}$, $S_{b1}$, $S_{c1}$, and $S_{d1}$ change to a sawtoothed shape between 0 and 1, as shown in FIGS. 7(A)–7(D), in each phase change and, when 1 is exceeded, return to 0, filter outputs $S_{a1}'$, $S_{b1}'$, $S_{c1}'$, and $S_{d1}'$ also change correspondingly. Since filter outputs $S_{a1}'$, $S_{b1}'$, $S_{c1}'$ have phases which are each shifted by ¶/2 corresponding to reference signals $S_{R3}$, $S_{R4}$, $S_{R5}$, and $S_{R6}$ in turn as shown in FIGS. 7(A)–7(D), their waveforms are discontinuous, as shown in FIGS. 9(A)–9(D), with their boundaries being 1 and 0 and each being shifted by ¶/2.

The result of selecting optimum phase signals $S_{a1}$, $S_{b1}$, $S_{c1}$, and $S_{d1}$ in each sampling using multiplexer 36 operated with selection signal $Y_n$ outputted from channel selector 35 is shown in the filter output of FIG. 9(E). The order of selecting such an optimum position of multiplexer 36 is shown in FIG. 9(F). Switch numbers $N_1$, $N_2$, $N_3$ and $N_4$ correspond to the numbers for obtaining phase signals $S_{a1}$, $S_{b1}$, $S_{c1}$, and $S_{d1}$, respectively in that order. In this example, the waveforms shown in FIG. 9(E) can be obtained by selecting switches in the order of $N_1 \Sigma N_2 \Sigma N_3 \Sigma N_2 \Sigma N_1 \Sigma N_2 \Sigma N_3 \Sigma N_2 \Sigma N_1$. (See FIG. 9(F)).

Schmitt trigger 21 converts the filter output shown in FIG. 9(E) to rectangular waves as shown in FIG. 9(G). In spite of the rapid change in the waveforms shown in FIG. 9(E) at the switch over points of multiplexer 36 with a width of 0.25 for the change, a rectangular Schmitt output can be obtained corresponding to vortex signals without problems because the median of the trigger level is set to be 0.5.

The foregoing is an overview description of the embodiment of FIG. 3. Details of the signal analyzer 33 and channel selector 35, which are used for selecting the optimum of phase signals $S_{a1}$, $S_{b1}$, $S_{c1}$, and $S_{d1}$ are shown in FIGS. 10 and 11, respectively.

Figure 10:
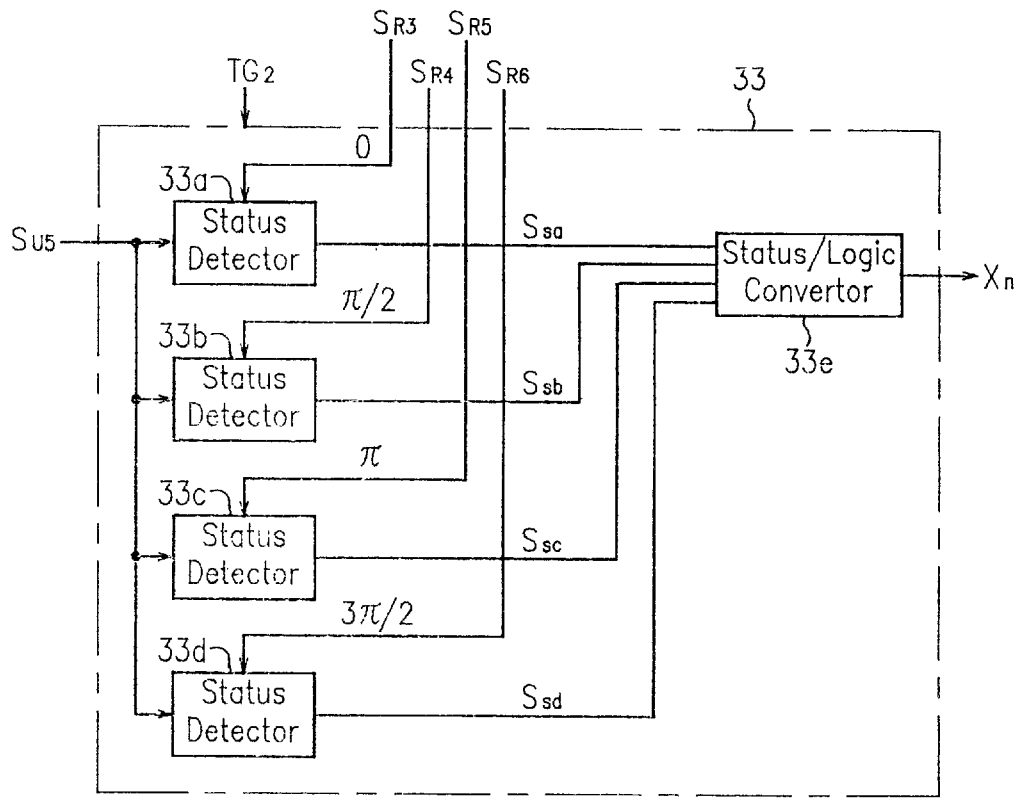
FIG. 10 is a block diagram depicting details of the signal analyzer of FIG. 3.

FIG. 10 shows details of the signal analyzer 33 of FIG. 3, wherein reference signals $S_{R3}$, $S_{R4}$, $S_{R5}$ and $S_{R6}$ of phase 0, ¶/2, ¶, and 3¶/2 are supplied to status detectors 33a, 33b, 33c, and 33d, respectively. These status detectors detect the status of the ultrasonic signal $S_{U5}$, i.e. whether it is at a high level or at a low level at the rise time of the reference signals, and then outputs the signals to the status/logic converter 33e as status signals $S_{Sa}$, $S_{Sb}$, $S_{Sc}$ and $S_{Sd}$. Status/logic converter 33e digitizes the phase status of the signal $S_{U5}$ using the status signals $S_{Sa}$, $S_{Sb}$, $S_{Sc}$, and $S_{Sd}$, and outputs the resulting signal as phase pattern signal $X_n$.

Figure 11:
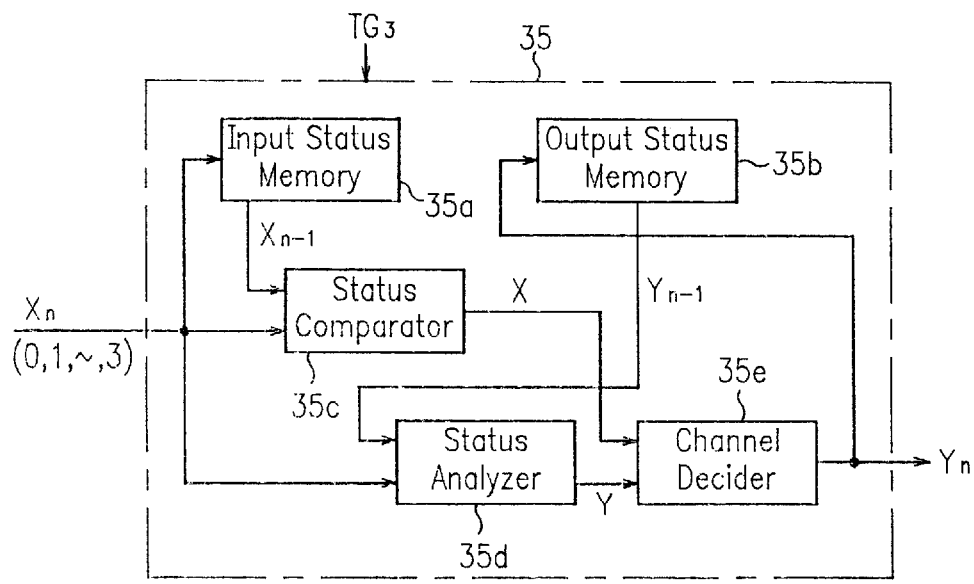
FIG. 11 is a block diagram depicting details of the channel selector of FIG. 3.

FIG. 11 shows details of the channel selector 35 in FIG. 3, wherein channel selector 35 comprises input status memory 35a, output status memory 35b, status comparator 35c, status analyzer 35d, and channel decider 35e.

Input status memory 35a stores phase pattern signal $X_{n-1}$ determined in a previous cycle in status/logic converter 33e (see FIG. 10). Output status memory 35b stores the contents of selection signal $Y_{n-1}$ outputted to multiplexer 36 in the previous cycle. Status comparator 35c recognizes the discrepancy between phase pattern signal $X_n$, determined in the current cycle, and phase pattern signal $X_{n-1}$, determined in the previous cycle. Status analyzer 35d recognizes the interrelationship between phase pattern signal $X_n$, determined in the current cycle, and selection signal $X_n$, determined in the previous cycle. Channel decider 35e receives the output X of status comparator 35c and the output Y of status analyzer 35d, respectively, and then outputs selection signal $Y_n$ for the current cycle by determining the output contents from the results of the decision for the inputs X and Y.

Figure 12:
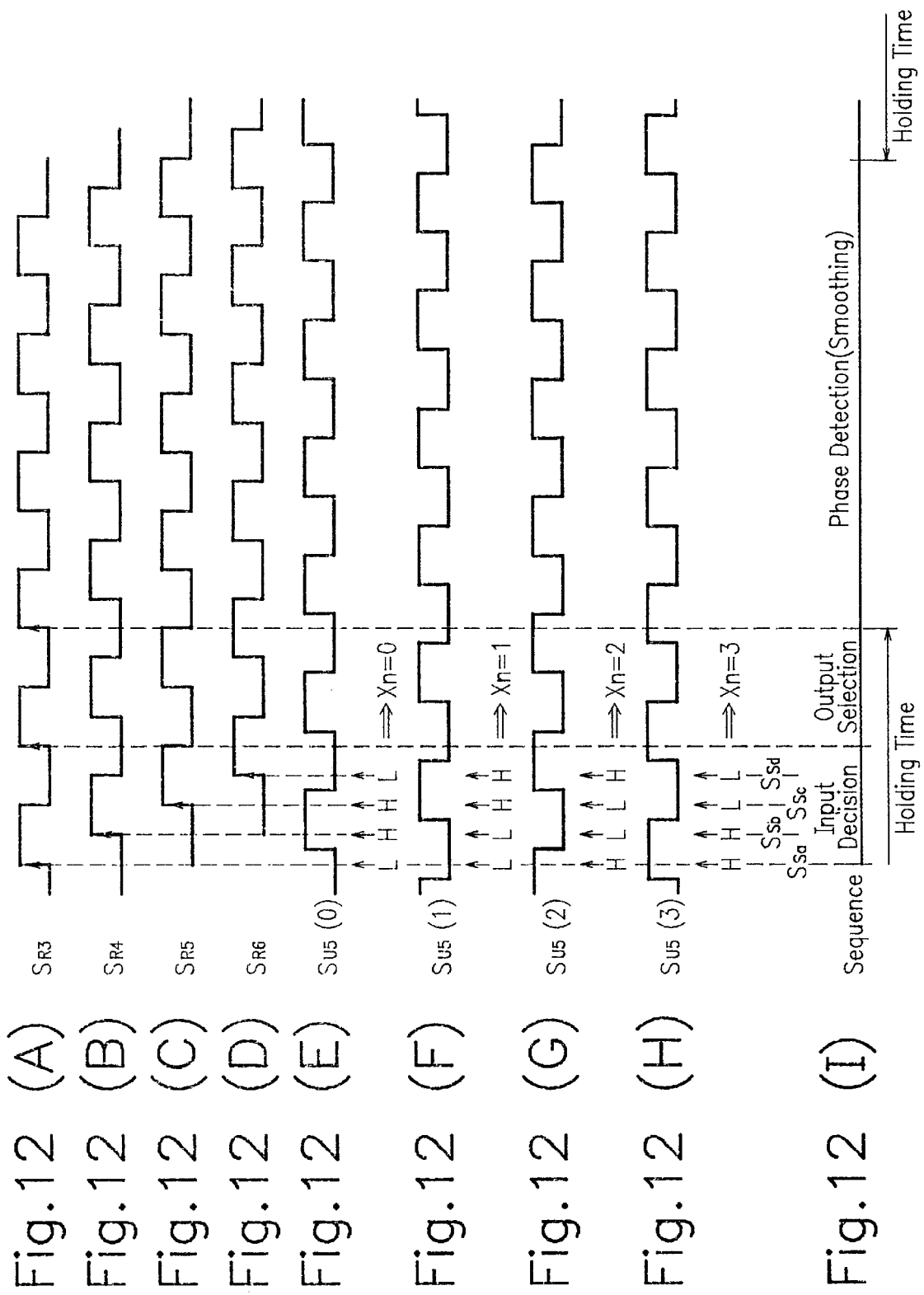
FIGS. 12(A)–12(I) are waveform diagrams depicting operation of the signal analyzer of FIG. 10.

Next, operation of signal analyzer 33, details of which are shown in FIG. 10, will be described with reference to the waveform diagrams of FIGS. 12(A)–12(I). FIGS. 12(A)–12 (D) show reference signals $S_{R3}$, $S_{R4}$, $S_{R5}$, and $S_{R6}$ having phases 0, ¶/2, ¶, and 3¶/2, respectively. FIGS. 12(E)–12(H) show ultrasonic signals in four phase statuses $S_{U5}(0)$, $S_{U5}(1)$, $S_{U5}(2)$, and $S_{U5}(3)$. FIG. 12(I) shows the sequence of the foregoing ultrasonic signals.

Status detectors 33a, 33b, 33c, and 33d (of FIG. 10) detect whether the ultrasonic signal $S_{U5}$ is at a high level or low level at the time of the rise of reference signals $S_{R3}$, $S_{R4}$, $S_{R5}$ and $S_{R6}$ and digitizes the foregoing statuses in status/logic converter 33e as the current phase pattern status of ultrasonic signal $S_{U5}$. For example, when ultrasonic signal $S_{U5}$ corresponding to reference signal $S_{R3}$ is ultrasonic signal $S_{U5}(0)$, which is in the phase relationship shown in FIG. 12(E), at the time of the rise of each reference signal $S_{R3}$, $S_{R4}$, $S_{R5}$, and $S_{R6}$, the levels of the ultrasonic signal $S_{U5}(0)$ are detected by the status detectors 33a, 33b, 33c, and 33d as binary data status signals $S_{Sa}$, $S_{Sb}$, $S_{Sc}$, and $S_{Sd}$ of low (L), high(H), high (H), and low (L). Then, status/logic converter 33e defines this phase status as phase pattern signal $X_n=0$ using the status signals $S_{Sa}$, $S_{Sb}$, $S_{Sc}$, and $S_{Sd}$ and outputs such signal.

Accordingly, for the statuses of signals $S_{U5}(1)$ to $S_{Ug}(3)$ (see FIGS. 12(F)–12(H)), status signals $S_{Sa}$, $S_{Sb}$, $S_{Sc}$, and $S_{Sd}$ represented by H or L are outputted in a phase relationship to one cycle of reference signals $S_{R3}$, $S_{R4}$, $S_{R5}$, and $S_{R6}$. Status/logic converter 33e defines the phase pattern signals $X_n=1$ to 3 using status signals and outputs the signals to channel selector 35.

The detection of phase pattern signals $X_n=1$ to 3 is controlled by timing signal $TG_2$ and detection is executed during a period corresponding to the first cycle of reference signal $S_{R3}$ of phase 0 as shown in FIG. 12(I). During the period corresponding to the second cycle, output selection is executed in channel selector 35 by timing signal $TG_3$, and further during the period corresponding to the third cycle. Later, sample/hold circuit 37 acquires the phase signal of the output by timing signal $TG_4$, and after smoothing, holds the signal for the period until the next phase detection begins. (See FIG. 12(I)). These operations are further described below.

Figure 13:
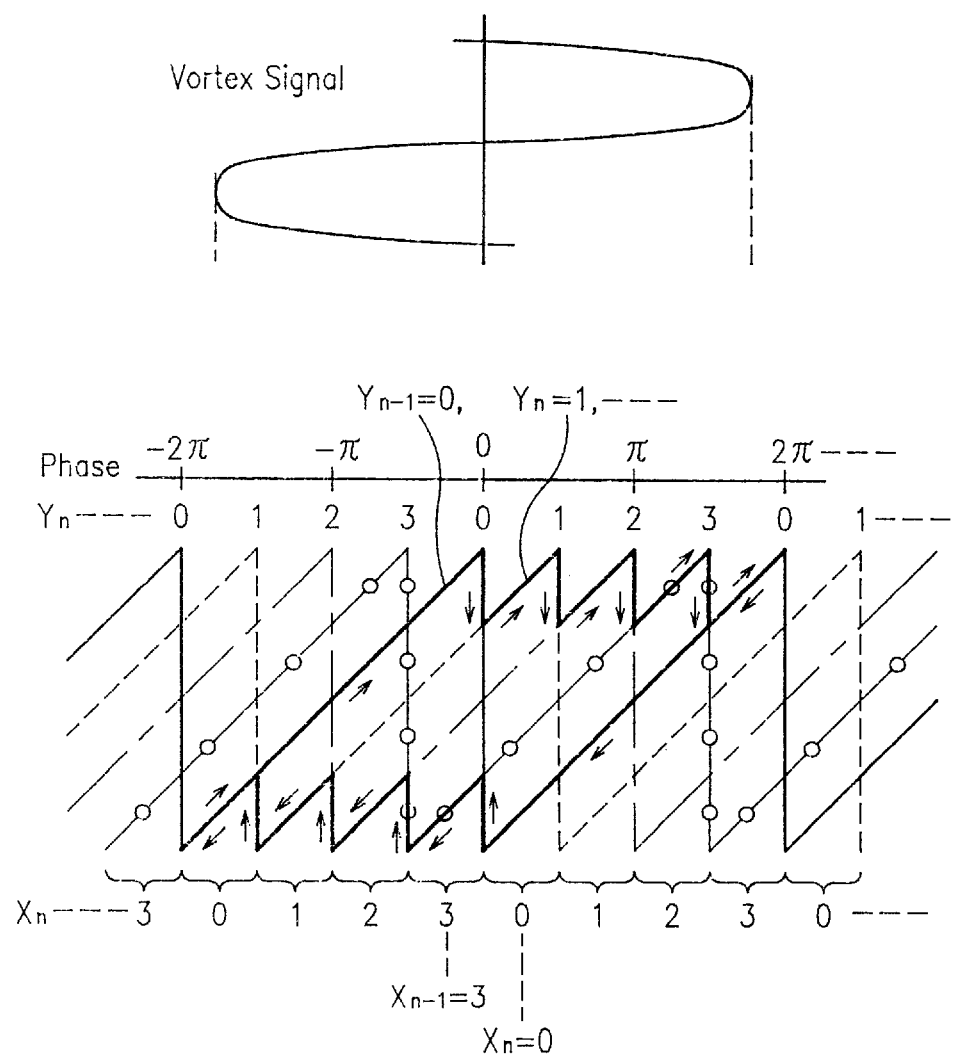
FIG. 13 is a selection diagram depicting operation of the channel selector of FIG. 11.

An overview of the operation of channel selector 35 will now be described with reference to FIGS. 11, 13 and 14. In FIG. 13, the upper part shows the waveform of a vortex signal when the phase shifts by 2¶ or more, the middle part shows the phases corresponding to the amplitude of the vortex signal, and the lower part shows the corresponding selection diagram. The selection diagram is obtained by combining the characteristics shown in FIGS. 7(A)–7(D) to explain which is to be selected among detectors 33a to 33d which have the characteristic shown in FIGS. 7(A)–7(D).

The selection number 0 of selection signal $Y_n$ shows the line segment or input/output characteristics of phase detector 32a for reference signal $S_{R3}$ of phase 0. The selection number 1 shows the line segment characteristics of phase detector 32b for reference signal $S_{R4}$ of phase ¶/2. The selection number 2 shows the line segment characteristics of phase detector 32c for reference signal $S_{R5}$ of phase ¶. The selection number 3 shows the line segment characteristics of phase detector 32d for reference signal $S_{R6}$ of phase 3¶/2.

The selection numbers 0, 1, 2, and 3 are represented by a solid line, a broken line, an alternating long and short dash line, and a circle dotten line, respectively. That is, phase detectors 32a to 32d are selected corresponding to $Y_n$,32 0 to 3, respectively. At the same time, phase pattern signals $X_n$ are represented by numbers 0 to 3 in order to identify which is the phase pattern of FIGS. 12(E) to 12(H) ultrasonic signal $S_{U5}$. The phases are shifted by ¶/2 in turn.

Figure 9:
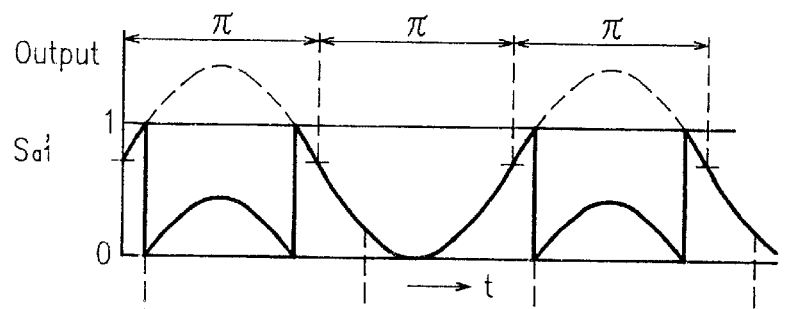
FIGS. 9(A)–9(G) are waveform diagrams depicting signal processing in the embodiment of FIG. 3 when the phase change due to the vortices is large.
Figure 9:
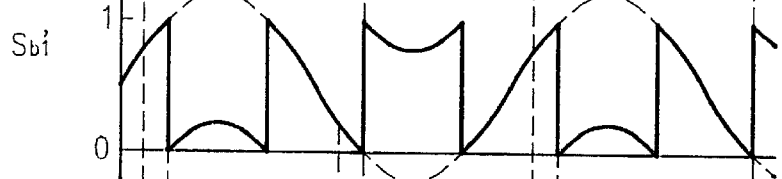
Figure 9:
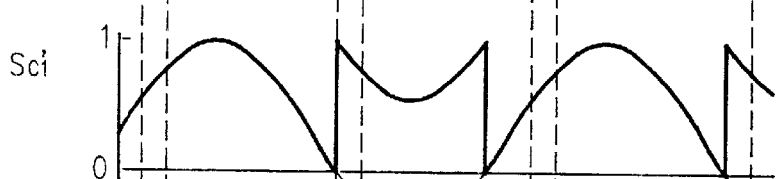
Figure 9:
Figure 9:
Figure 9:
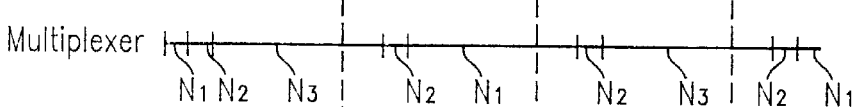
Figure 9:
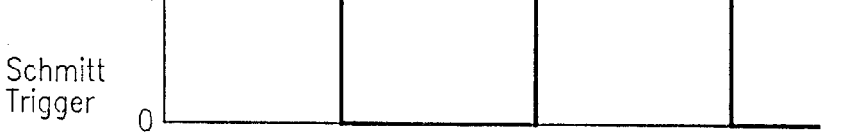

In a manner similar to FIG. 9, in order to restore normal vortex signals, selection signal $Y_n$ is switched so that its connection is closed in a circulating manner as shown by the thick lines in the selection diagram corresponding to the vortex signal shown in the upper part of FIG. 13. To process this operation logically, data processing is executed as shown in the flow chart of FIG. 14. The right margin of FIG. 14 identifies the particular circuits of FIG. 11 which execute the signal processing corresponding to the flow steps shown to the left thereof. In the following description, in counting the selection signals $Y_n$ and phase pattern signals $X_n$, the rule to use is to add 1 when the number changes from 3 to 0, and to subtract 1 when the number changes from 0 to 3.

Figure 14:
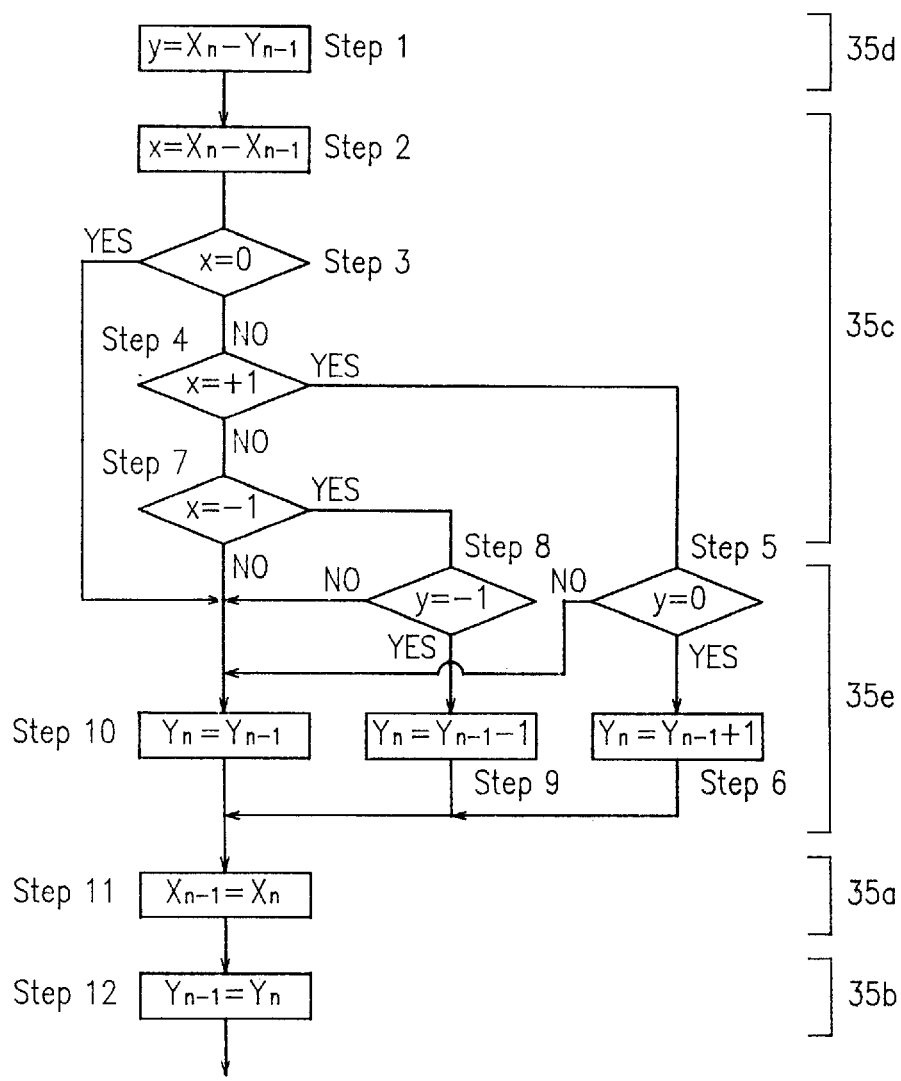
FIG. 14 is a flow chart depicting operation of the channel selector of FIG. 11.

In FIG. 14, step 1, status analyzer 35d recognizes the relationship between phase pattern signal $X_n$ of ultrasonic signal $S_{U5}$ inputted in the current cycle and selection signal $Y_{n-1}$ (which was stored in output status memory 35b) showing the phase detector selected in the previous cycle; computes the differen y between the two signals; and outputs the results to channel decider 35e.

In step 2, input comparator 35c computes the difference x between phase pattern signal $X_n$ of ultrasonic signal $S_{U5}$ inputted in the current cycle and phase pattern signal $X_{n-1}$ (which was stored in input status memory 35a) of ultrasonic signal $S_{U5}$ inputted in the previous cycle.

In step 3, it is decided whether there is a change in phase pattern signal $X_n$ or not in input comparator 35c. If there is no change, the flow skips to step 10 where channel decider 35e outputs selection signal $Y_{n-1}$ in the previous cycle as selection signal $Y_n$ in the current cycle and proceeds to step 11 and then step 12, where the contents of the input status member 35a and the output status memory 35b are replaced by those in the current cycle, respectively.

If there is a change in step 3, the flow proceeds to step 4, where the flow proceeds to step 5 if the phase pattern signal $X_n$ has increased to +1. In step 5, it is decided at which point of the selection diagram (see FIG. 13) $X_n$ has been increased.

In step 5, if y=0 holds with $X_{n=}Y_{n-1}$ as a result of the increase of $X_n$ by one, that is the phase pattern is increased by one, the phase signal of the input jumps out to the upper right part of the selection diagram necessitating output switching. For example, this means that it is necessary to switch the linear characteristics for $Y_{n-1}=0$ to the linear characteristics for $Y_n=1$ in FIG. 13. That is, the phase detector 32a is switched to phase detector 35b. Accordingly, $Y_n=Y_{n-1}+1$ should be executed in step 6 to switch channels. The result is outputted and the flow proceeds to step 11 and step 12 where the contents of the input status memory 35a and the output status memory 35b are replaced by those in the current cycle, respectively.

In step 5, if y=0 does not hold in spite of the increase of $X_n$ by 1, this means that it is not necessary to switch channels because the phase signal of the input changes on the same line in the selection diagram of FIG. 13, and $Y_n$ should remain as the previous value.

If there is no need to change $Y_n$, the flow proceeds to step 10, and the channel decider 35e outputs selection signal $Y_{n-1}$ in the previous cycle as selection signal $Y_n$ in the current cycle and the flow proceeds to step 11 and step 12 where the contents in the input status memory 35a and the output status memory 35b are replaced by those in the current cycle, respectively.

The process flow of steps 3,4,5 and 6 corresponds to the upper right part of the line segment characteristics in the selection diagram of FIG. 13 and the select characteristics for the saw tooth shaped wave represented by the thick lines in the direction of the increase in phase shift.

Figure 15:
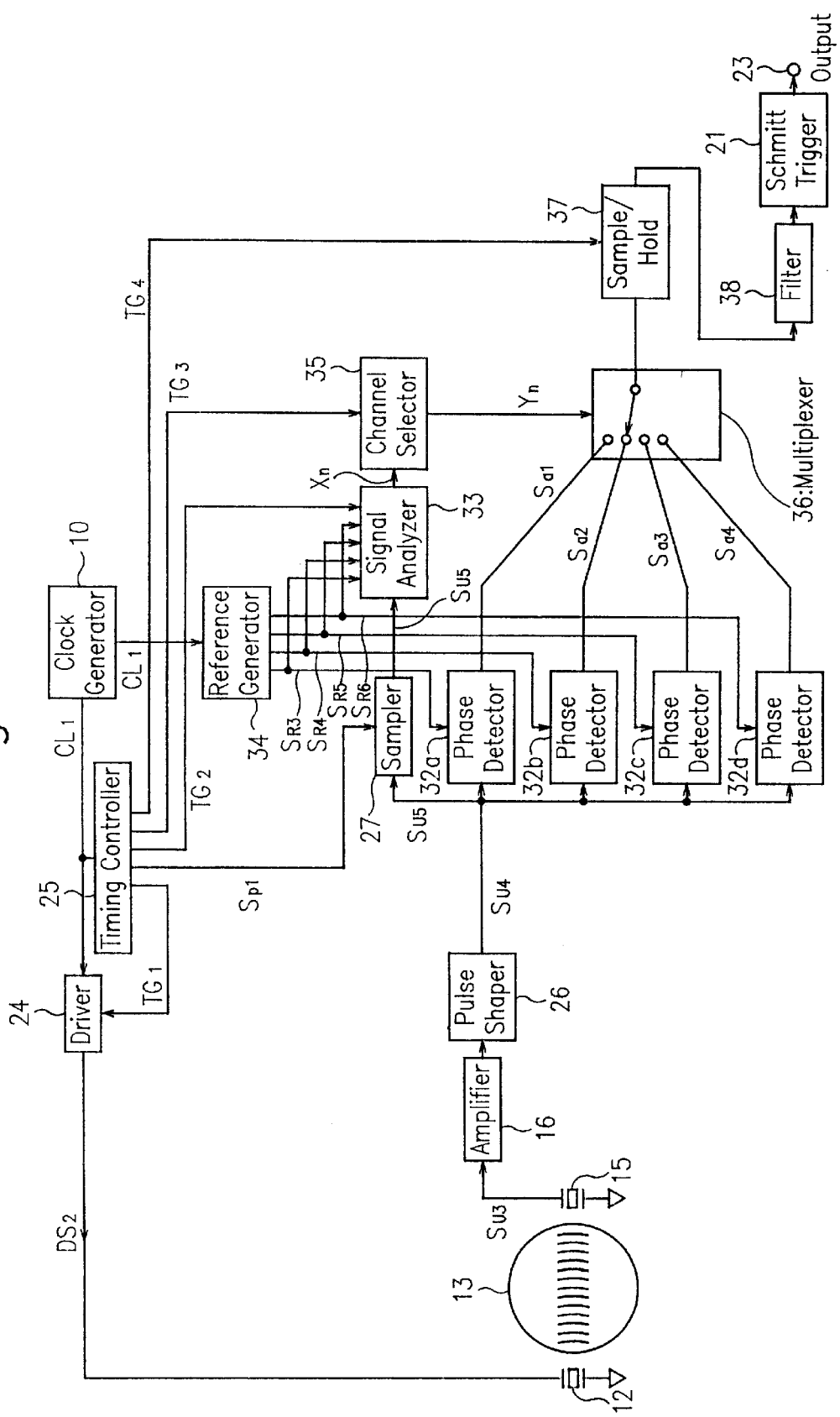
FIG. 15 is a block diagram depicting a second illustrative embodiment of the invention.

Next, if there is a change in step 3, the flow proceeds to step 4. If x=+1 does not hold, the flow proceeds to step 7. In step 7, contrary to x=+1, a decision is made in the case where phase pattern signal $X_n$ decreases to −1 (that is the phase pattern is decreased by 10. In this case, the step corresponds to the lower left part of the line segment characteristics in the selection diagram of FIG. 13, and the select characteristics for the sawtooth shaped wave with thick lines in the direction of decreasing phase shift. In this case, steps 8 and 9 are opposite to steps 5 and 6, and a decision is made in the manner similar to selection processing FIG. 15 shows the second embodiment which differs from the embodiment of FIG. 3. The parts having the same functions as in FIG. 3 are provided the same numbers and description thereof is omitted hereat for sake of clarity.

The embodiment outputs ultrasonic signal $S_{U4}$ (see FIG. 4(C)), which is the output from pulse shaper 26 and is directly supplied to phase detectors 35a–32d without use of a sampler 27 (as in FIG. 3). Rather, signal $SU_4$ is supplied to sampler 27 and then to signal analyzer 33. The embodiment produces a similar effect to that provided by the embodiment of FIG. 3.

Figure 16:
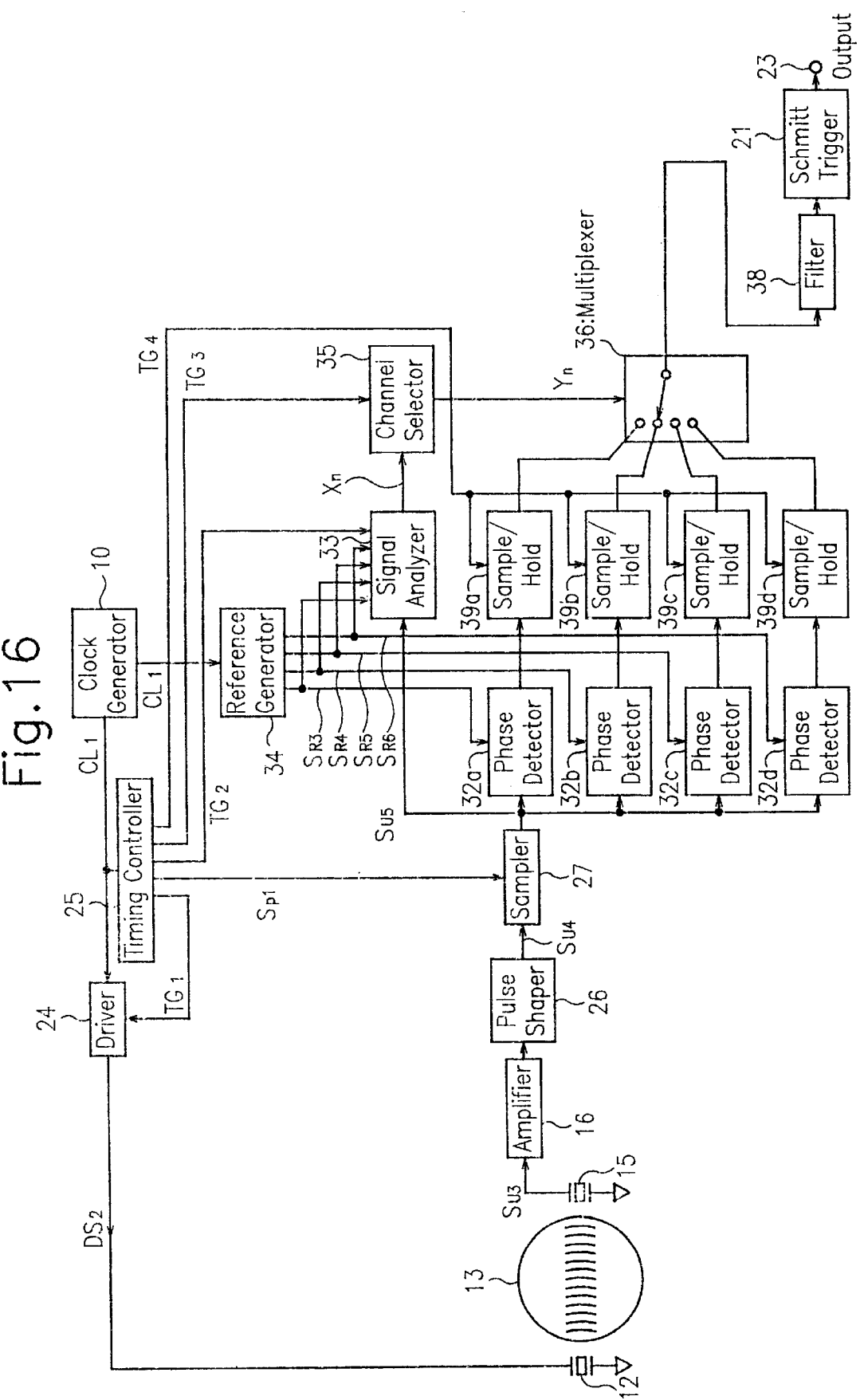
FIG. 16 is a block diagrams depicting a third illustrative embodiment of the invention.

FIG. 16 shows the third embodiment which differs from the embodiment of FIG. 3 in that four sample/hold circuits 39a,39b,39c, and 39d are used in place of the single sample/hold circuit 37 in FIG. 3. The sample/hold circuits are provided for each of the phase detectors 35a,32b,32c, and 32d, respectively, and outputs from these sample/hold circuits are selected by multiplexer 35 and then outputted to filter 38. The embodiment produces an effect similar to that of the embodiment of FIG. 3.

Figure 17:
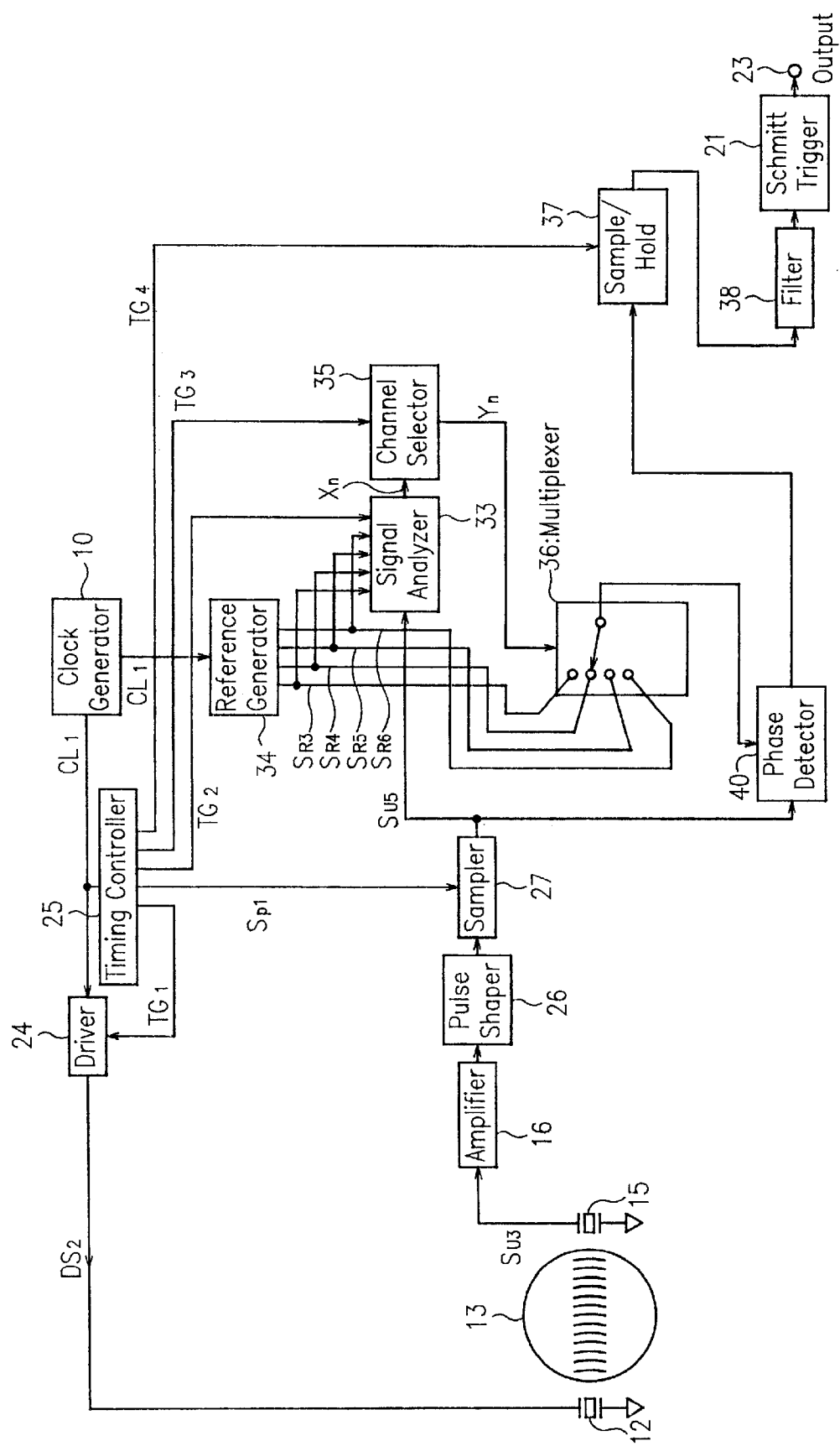
FIG. 17 is a block diagram depicting a fourth illustrative embodiment of the invention.

FIG. 17 shows the fourth embodiment which differs from the embodiment of FIG.3 in that four phase detectors 35a ,32b,32c, and 32d of FIG. 3 are replaced by a single phase detector 40, and reference signals $S_3$, $S_{R4}$, $S_{R5}$, and $S_{R6}$ are switched by multiplexer 36 and supplied to phase detector 40. The embodiment produces an effect which is similar to that of the embodiment of FIG. 3.

Figure 18:
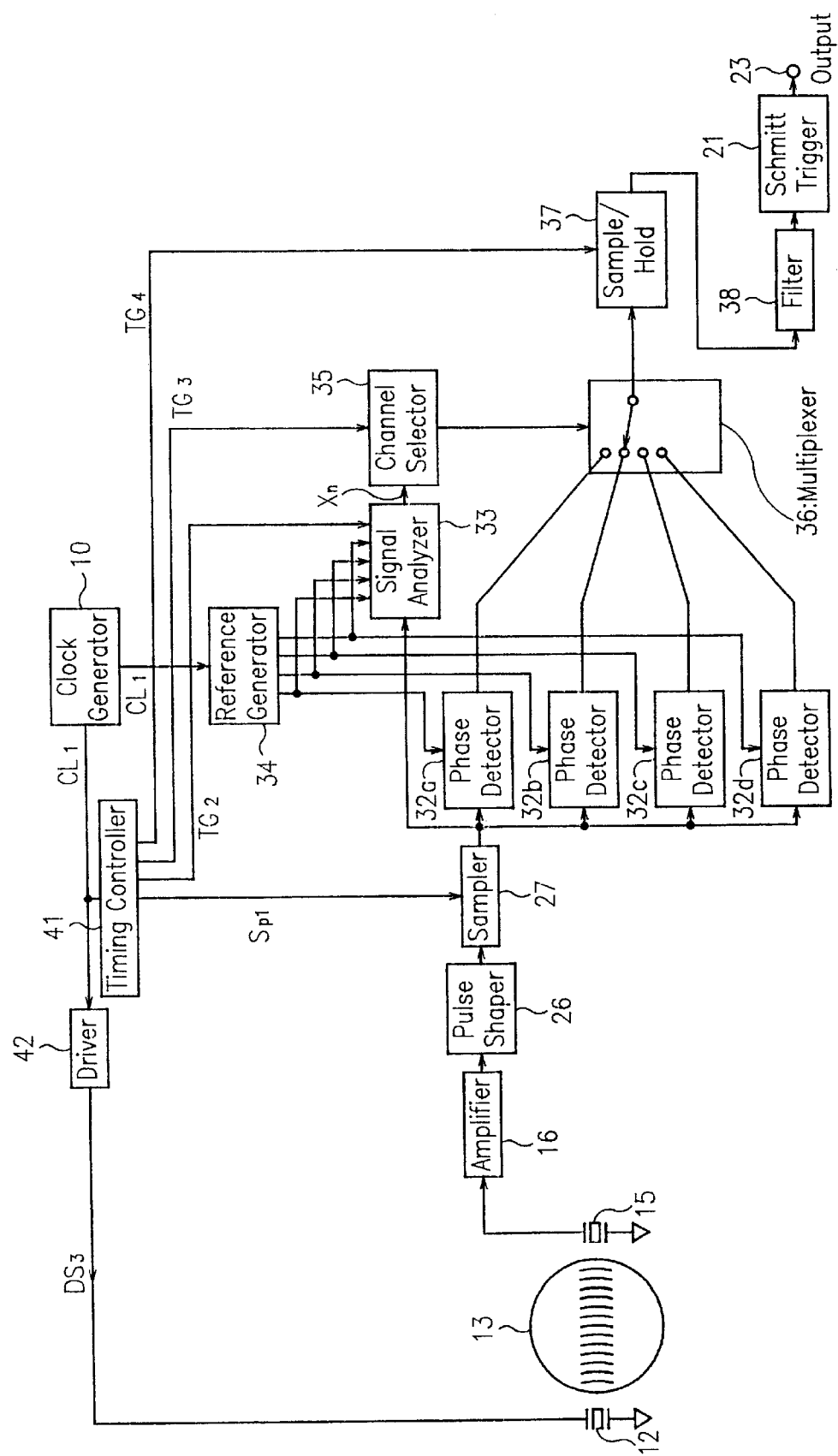
FIG. 18 is a block diagram depicting a fifth illustrative embodiment of the invention.

FIG. 18 shows the fifth embodiment which differs from the embodiment of FIG. 3 in that timing control 25 of FIG. 3 is replaced with timing controller 41. Basically, the embodiment has functions similar to those in FIG. 3, except that the timing signal $TG_1$ is not used. Consequently, drive signal $DS_1$ outputted by driver 42 is a continuous wave and signal processing is executed in the same manner as in FIG. 3. The embodiment has an effect similar to that in FIG. 3.

FIGS. 19(A)–19(C) show the case where the number of burst waves $DS_2'$ (see FIG. 19(A)) outputted by the driver and decreased to be less than that of burst waves $DS_2$ shown in FIG. 4, are transmitted. The waves are then received as ultrasonic signals $S_{U3}'$ (see FIG. 19(B)) and further sampled with sampling signal $S_{P1}'$ (see FIG. 19(C)) outputted from timing controller 25. In this case, the ultrasonic signal waves are sampled before they reach a steady state value using sampling signal $S_{P1}'$.

The foregoing case has the advantage of making the separation of signals from noise easy even when waves are reflected a plurality of times or reverberated in the metering pipe 13 and are superimposed because the received signal waves can be sampled before the noise is received after making detours through pipe 13.

In addition, signal processing in the embodiment of FIG. 3 and FIGS. 13 to 18 uses discrete hardware components, such as gate arrays However, the signal processing can also be implemented by software.

Figure 20:
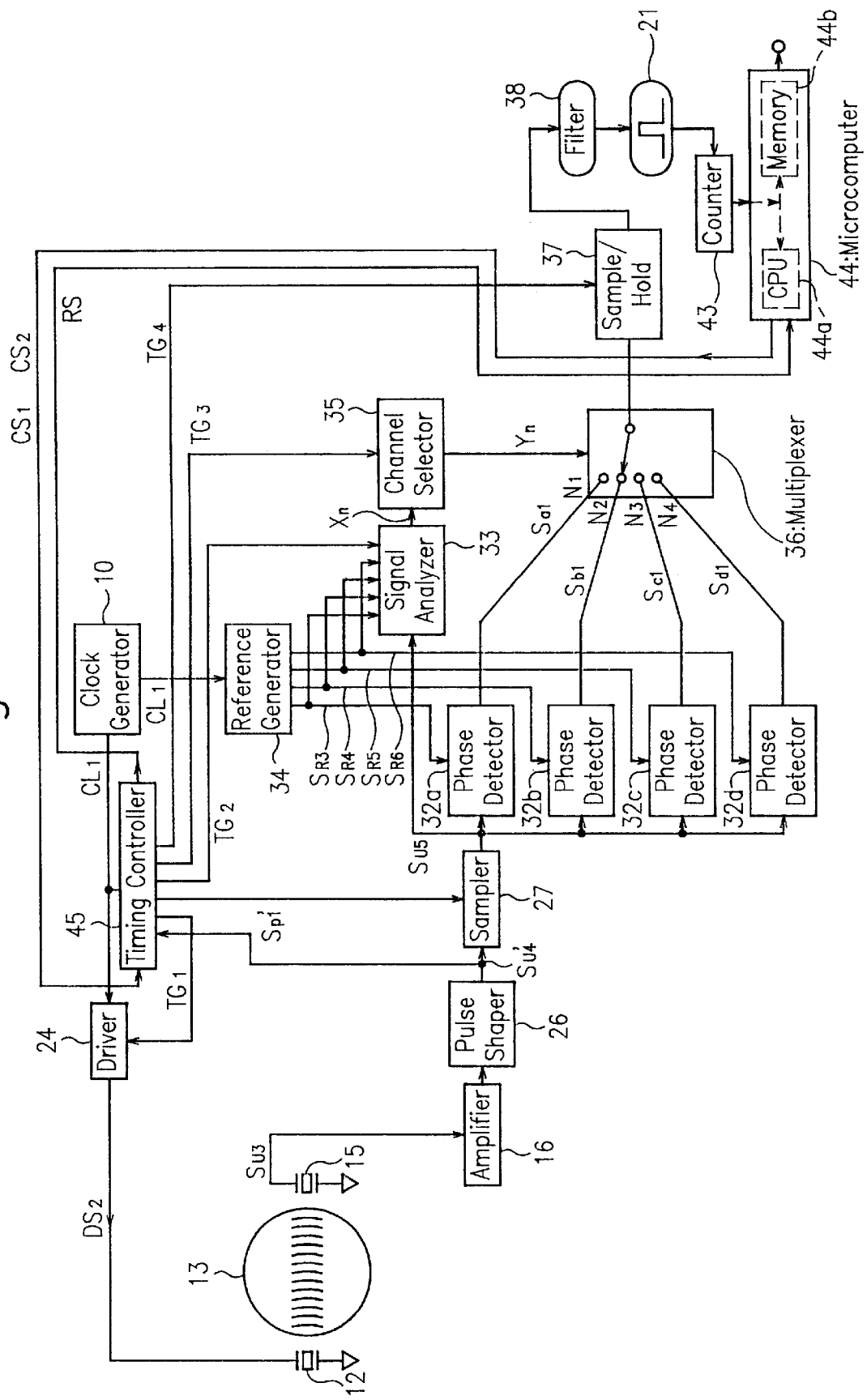
FIG. 20 is a block diagram depicting a sixth illustrative embodiment of the invention wherein the effect of sound velocity is removed from the embodiment of FIG. 3.

FIG. 20 shows an embodiment which eliminates influence of sound velocity, wherein a microcomputer 44 is added for signal processing using a pulse signal obtained after Schmitt trigger 21 of FIG. 3. Pulse signals from Schmitt trigger 21 are converted to digital signals with counter 43 and applied to microcomputer 44. Microcomputer 44 comprises a central processing unit (CPU) 44a, and memory 44b, and executes various functions, such as time signal generation, output control, computation, etc, and is not limited to flor signal processing.

To remove the effect of sound velocity, sampling signal $S_{P1}'$ must be retained in the optimum position by switching controlling timing controller 45 using microcomputer 44, which supplies signals $CS_1$, $CS_2$ and receives signal RS. The timing controller 45 may be as shown in FIG. 21 with its operation being as shown in FIG. 22.

FIG. 21 shows timing controller 45 comprising divider 46, counter 47, and gate generator 48. Microcomputer 44 (see FIG. 20) supplies to timing controller 45 signal $CS_1$ to control the dividing ratio of divider 46 and signal $CS_2$ to gate generator 48 to control sampling signal $S_{P1}'$.

Divider 46 receives reference clock $CL_1$ from clock generator 10, divides the reference clock $CL_1$ corresponding to the division ratio determined by control signal $CS_1$ and, by providing timing signal $TG_1$ (see FIG. 22(A)) to cause transmission of burst waves to driver 24, drive signal $DS_2$ (see FIG. 22(B)) is transmitted to ultrasonic transmitter 12.

Counter 47 starts counting reference clock $CL_1$ inputted in synchronism with the rise of timing signal $TG_1$ and supplies counts "n" from its output terminal Q to microcomputer 44, as receiving signal RS by receiving ultrasonic signal $S_{U4}'$ (see FIG. 22(C)). If it is assumed that the inner diameter of pipe 13 is "D", and the frequency of reference clock $CL_1$ is "$f_o$", CPU 44a can calculate the sound velocity "C" using the following expression stored in memory 44b:

$$C = D/(n/f_o) \qquad (3)$$

CPU 44a (see FIG. 20) computes the time when sampling signal $S_{P1}'$ is to rise following the computing procedure stored in memory 44b using sound velocity C obtained in such a manner, and applies control signal $CS_2$, which sets the computed value as a preset setpoint PS, to gate generator 48. The preset setpoint PS is set in such a manner that the setpoint is the time when a predetermined number of waves is reached after receiving sampling signal $S_{P1}'$.

Gate generator 48 (of FIG. 21) starts counting for reference clock $CL_1$ inputted in synchronism with the rise of the timing signal $TG_1$. When this count reaches the preset set point PS, the gate generator provides sampling signal $S_{P1}'$ (see FIG. 22(D)) whose gate width is set in advance, from the output terminal Q.

Since the position of the sampling signal $S_{P1}'$ is set accurately by measuring sound velocity C in such a manner, even when the sound velocity changes greatly, generated vortex signals cannot be missed by a shift in the gating position. However, it is not necessary to measure the sound velocity for every burst wave emission. It is sufficient to carry out the measurement in any cycle as desired.

Figure 23:
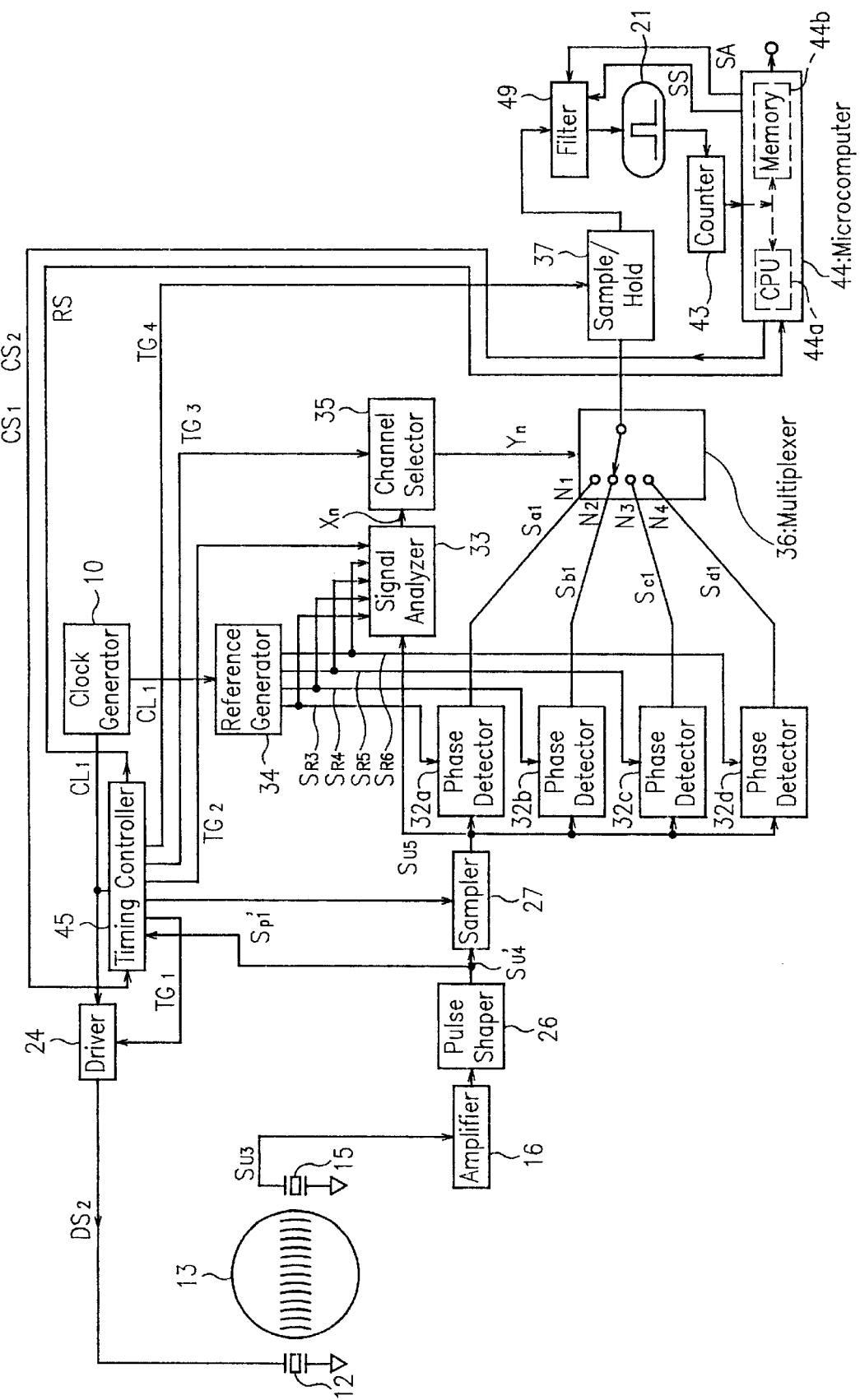
FIG. 23 is a block diagram depicting a seventh illustrative embodiment of the invention wherein vortex signal waveform shaping is executed for every size of metering pipe for the embodiment of FIG. 20.

FIG. 23 shows an embodiment wherein vortex signal waveform shaping is effectively executed for each different size of pipe 13 by replacing filter 38 of FIG. 20 with filter 49. In filter 49, filter corner frequencies are switched with size selection signal SS outputted by microcomputer 44, and sound velocity compensation is carried out by sound velocity adjustment signal SA also outputted by microcomputer 44.

Figure 24:
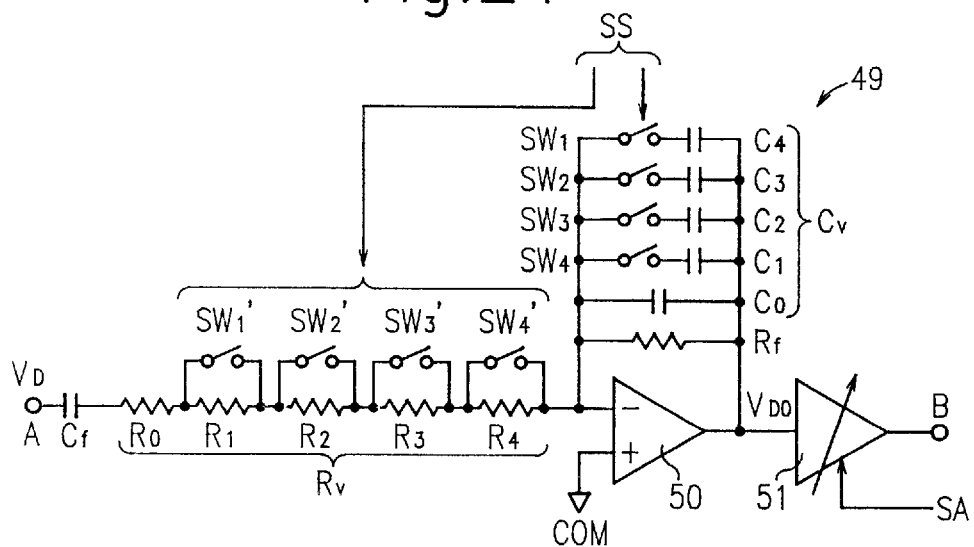
FIG. 24 is a circuit diagram depicting details of the filter in the embodiment of FIG. 23.

FIG. 24 shows details of the filter 49.

Both the signal frequency band and amplitude of vortex flowmeter signals are different for each respective meter size. Thus, generally, the signal processing circuit becomes complex. However, by using the circuitry of FIG. 24, simplification is attained. The filter of FIG. 24 comprises a fixed capacitor $C_o$; series circuit capacitors $C_1$ to $C_4$, corresponding to switches $SW_4$ to $SW_1$; a resistor $R_f$ connected in parallel across the inverted input terminal (–) and the output terminal of operational amplifier 50 whose non-inverted terminal (+) is connected to the common potential point COM; a fixed capacitor $C_f$; fixed resistor $R_o$; and resistors $R_1$ to $R_4$ each connected in parallel to switches $SW_1'$ to $sW_4'$, respectively, and connected in series between the inverted input terminal (–) of operational amplifier 50 and input terminal A to which the output signal from sample/hold circuit 37 is inputted. These circuit elements form a bandpass filter as a whole.

Switches $SW_1$ to $SW_4$ and $SW_1'$ to $SW_4'$ are switched by size selection signal SS outputted by microcomputer 44. The output terminal of operational amplifier 50 is connected to the input terminal of variable gain amplifier 51. The gain of amplifier 51 is also adjusted by the sound velocity adjustment signal SA outputted by microcomputer 44. Finally, the output of operational amplifier 50 is outputted to the input terminal of Schmitt trigger 21 via output terminal B of variable amplifier 51.

The operation of the bandpass filter 49 will be described with reference to the characteristic diagram of FIG. 25, wherein the horizontal axis represents the vortex frequency $f_v$ and the vertical axis represents the gain $G_{A1}$. If the series resistance value of fixed resistor $R_o$ and resistors $R_1$ to $R_4$ is represented by $R_v$ and the parallel capacitance value of fixed capacitor $C_o$ and capacitors $C_1$ to $C_4$ is represented by $C_v$, the lower limit corner frequency $F_{CL}$ is determined by the following:

$$f_{CL} \alpha 1/C_f R_v \tag{4}$$

The upper limit corner frequency $f_{CH}$ is determined by the following:

$$f_{CH} \alpha 1/R_f C_v \tag{5}$$

The gain $G_{AA}$ is determined by the following:

$$G_{AA} = (R_f/R_v) \tag{6}$$

At the same time, modulation factor "m", indexing the amount of phase change due to the vortices, is given by the following expression which corresponds to the second term of equation (2):

$$m \alpha D V_v f_s / C^2 \tag{7}$$

wherein D is the diameter size, $V_v$ is the flow velocity, C is the sound velocity, and $f_s$ is the frequency of the ultrasonic signal.

The amplitude of the phase demodulation signal $V_D$ of the vortices obtained at input terminal A is expressed as follows because it is proportional to modulation factor "m" when the frequency of ultrasonic signal $f_s$ is constant:

$$V_D \alpha D V_v / C^2 \tag{8}$$

Vortex frequency $f_v$ is represented by the following:

$$f_v \alpha V_v / D \tag{9}$$

Microcomputer 44 sets resistance $r_v$ of the bandpass filter to be proportional to size D, and capacitance $C_v$ to be proportional to size D using size selection signal SS outputted to filter 49. With this setting, bandpass filter gain $G_{AA}$ is set to be inversely proportional to size D. That is, resistance $R_v$ is proportional to size D. Since modulation factor "m" is proportional to size D, from equation (7), the amplitude of vortex phase demodulation signal $V_{DO}$ becomes independent of size D but dependent on sound velocity C and flow velocity $V_v$ only. Accordingly, the invention has the advantage of waveforms which are unlikely to become saturated.

In addition, since gain $G_{AA}$ and lower limit corner frequency $F_{CL}$ are inversely proportional to resistance $R_v$, that is to meter size D, as shown in equations (4) and (6). Also, capacitance $C_v$ is set to be proportional to size D by size selection signal SS, and upper limit corner frequency $f_{CH}$ is inversely proportional to size D.

Figure 25:
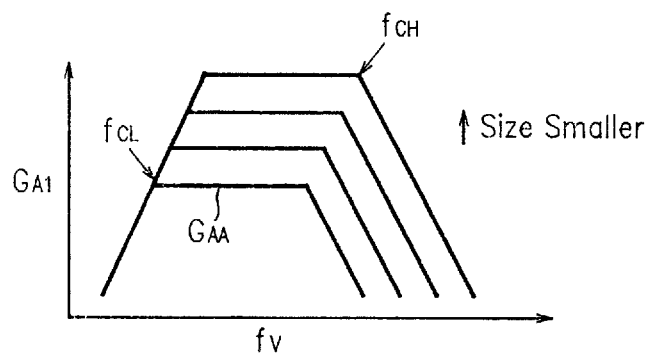
FIG. 25 is a characteristic diagram depicting operation of the filter of FIG. 24.
Figure 26:
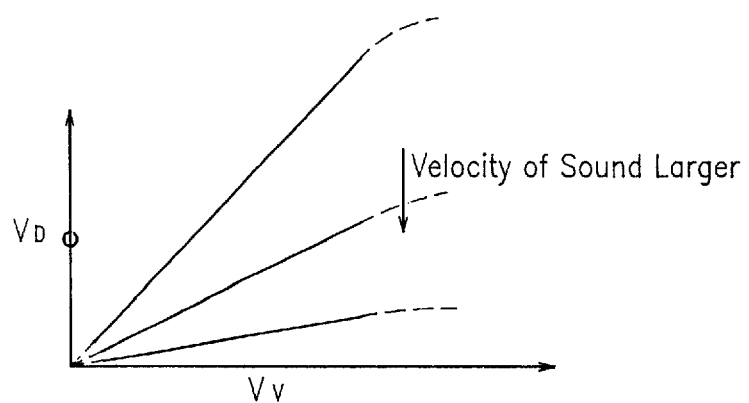
FIG. 26 is a characteristic diagram depicting the relationship between flow velocity and phase demodulation signal of the filter of FIG. 24.

Accordingly, as shown in FIG. 25, the bandwidths of the bandpass filter are equal in the flow velocity range of each size. Also, the relationship between flow velocity $V_v$ and phase demodulation signal $V_{DO}$ shows no dependency on size and varies dependent on sound velocity C only, as shown in FIG. 26.

The vortex phase demodulation signal $V_{DO}$ obtained at the output terminal of operational amplifier 50 varies with sound velocity C and flow velocity $V_v$. For sound velocity C, the gain of variable gain amplifier 51 is compensated by sound velocity adjustment signal SA outputted by microcomputer 44, and outputted to output terminal B. Sound velocity adjustment signal SA is prepared using sound velocity C computed in equation (3) using CPU 44a of FIG. 20.

Filter 49 comprises $R_v$ and $C_v$ as the variable components, and $C_f$ and $R_f$ as fixed components. Although $C_f$, which determines the lower side corner frequency, has a large capacitance, it is advantageous in that it is inexpensive because of its large size. Filter 49 also has the advantage that the number of components and control lines are few in number and of simple construction.

Figure 27:
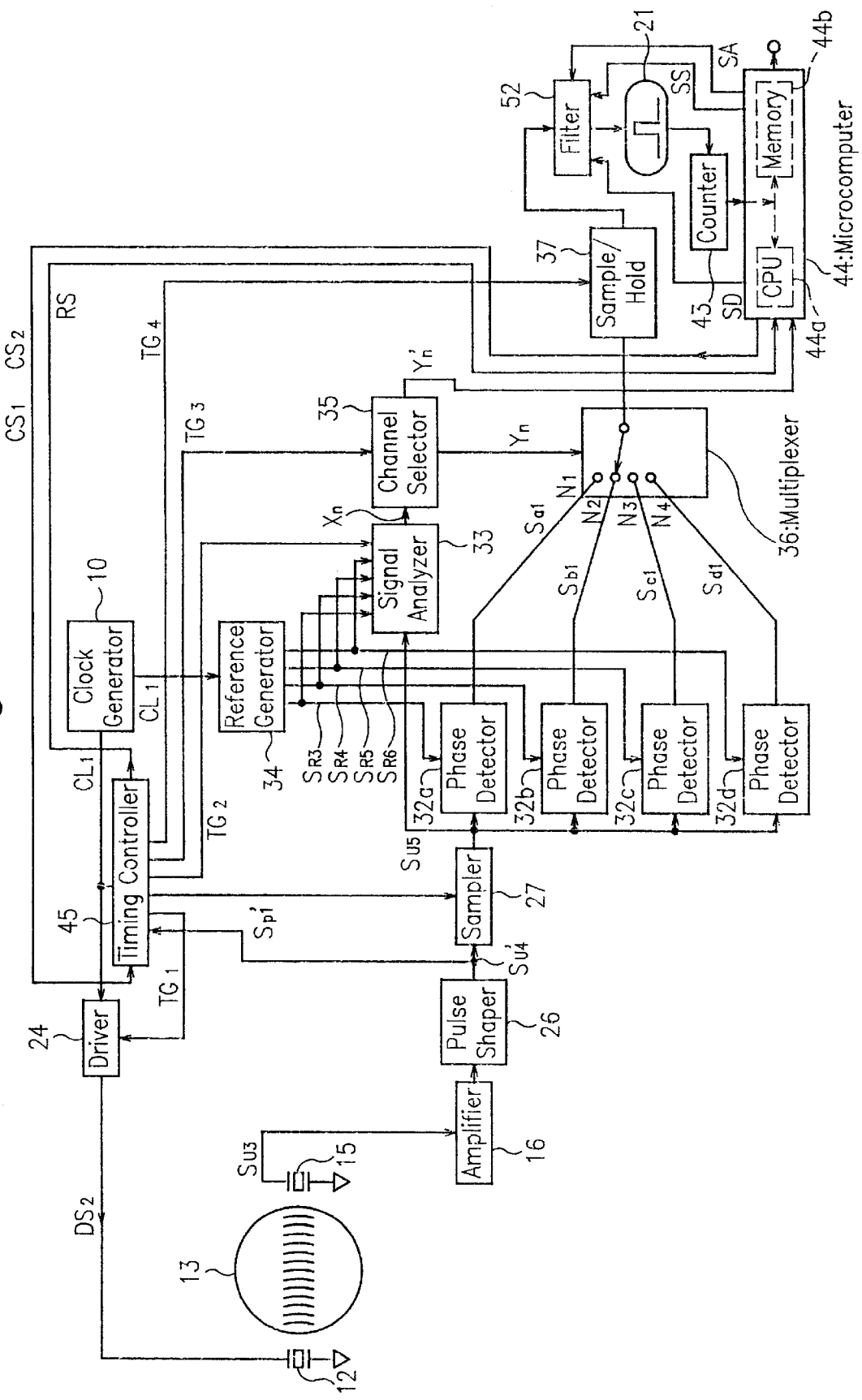
FIG. 27 is a block diagram depicting an eighth illustrative embodiment of the invention obtained by improving a part of the embodiment of FIG. 23.

FIG. 27 shows an embodiment wherein a part of the embodiment of 23 is improved. Also, FIG. 28 shows a filter which is improved over the components of FIG. 24.

In FIG. 27, selection signal $V_n'$ is inputted by channel selector 35 to microcomputer 44. Microcomputer 44 applies a switching signal SD to filter 52.

In FIG. 28, switch $SW_5$ is connected to the connection between capacitor $C_f$ and resistor $R_o$ and to common potential point COM. Switch $SW_5$ is opened and closed by use of switching signal SD outputted by microcomputer 44.

Next, operation of filter 52 will be described with reference to FIG. 29 and as compared to filter 49 of FIG. 24. In filter 52, for example, where modulation factor "m" (see equation (7)) of vortex phase demodulation signal $v_D$ (see FIG. 29(A)) inputted to input terminal A is small, if the reference wave is switched when the signal $V_D$ base linearly drifts by the initial phase change, due to a temperature change, and the phase change exceeds $2\pi$, signal $V_D$ represents a large differentiated change at the instant of switching as shown in FIG. 29(B). This is due to an abrupt voltage change resulting in a state where measurement is impossible for a prolonged period. Thus, switch $SW_5$ is closed by switching signal SD at this switching point (see FIG. 29(D))

to short circuit the connection point of capacitor $C_f$ and resistor $R_o$ with common potential point COM. Thus, the period when measurement is impossible becomes short, being that period when there is a short circuit only (see FIG. 29(C)). Accordingly, the invention enjoys the advantage of rapid return after switching.

The switching signal SD is provided by microcomputer 44. Modulation factor "m" is calculated and determined in microcomputer 44 by equation (7). This factor "m" is first compared with a small predetermined value "$m_o$" stored in memory 44b. As a result, when the the relation m<$m_o$, switching signal SD is outputted to close switch SW$_5$ associated with switching by selection signal $Y_n$' outputted by channel selector 35. However, if m>$m_o$, switching signal SD is not outputted regardless of a change in selection signal $Y_n$'. Accordingly, when modulation factor "m" is large, the reference signal is switched depending on normal selection signal $Y_n$ only. However, if modulation factor "m" is small, short circuiting switch SW$_5$ can output a stable signal because influence on the reference switching signal is small.

Figure 31:
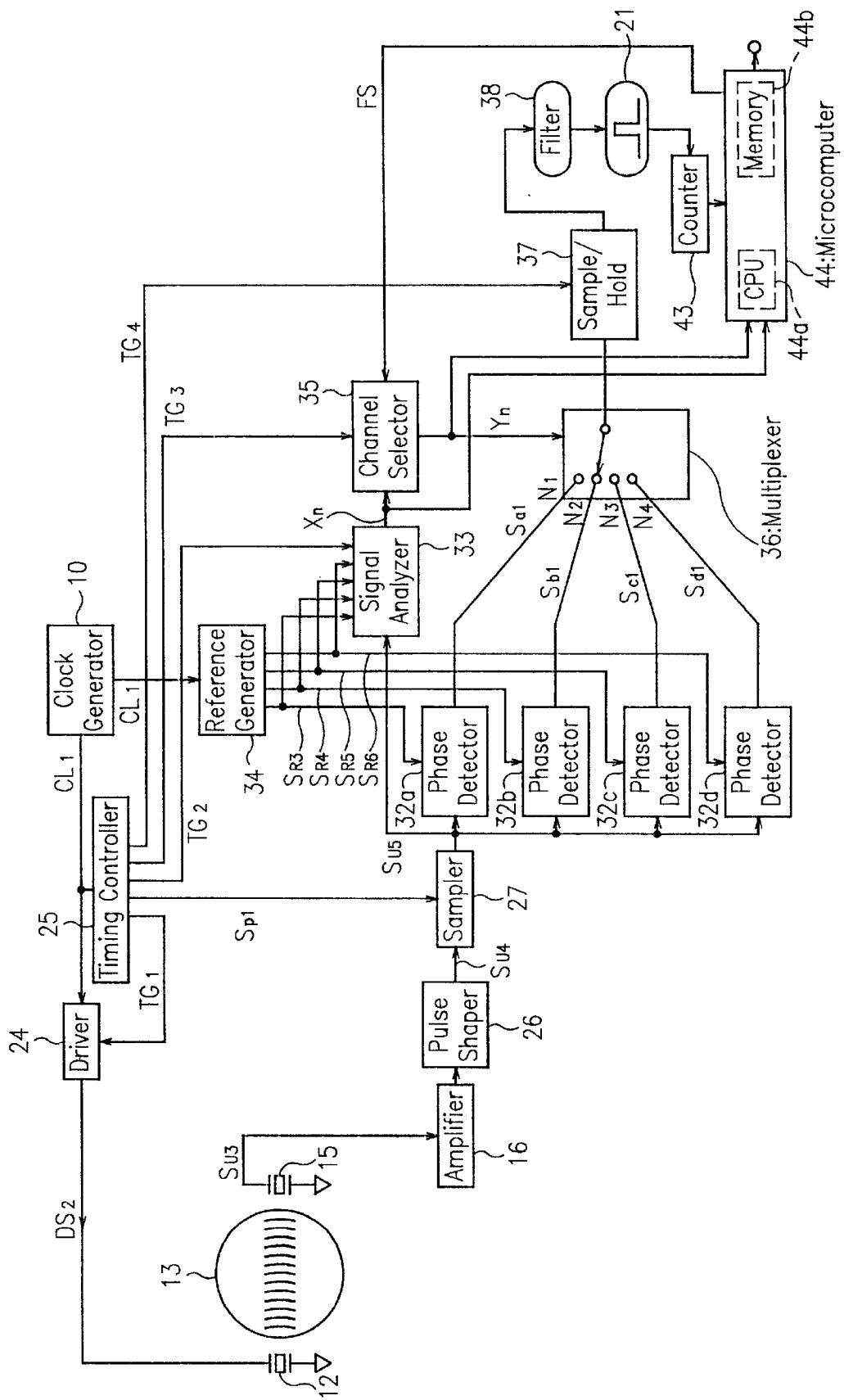
FIG. 31 is a block diagrams depicting a ninth illustrative embodiment of the invention wherein problems occurring in the embodiment of FIG. 20 are solved.
Figure 32:
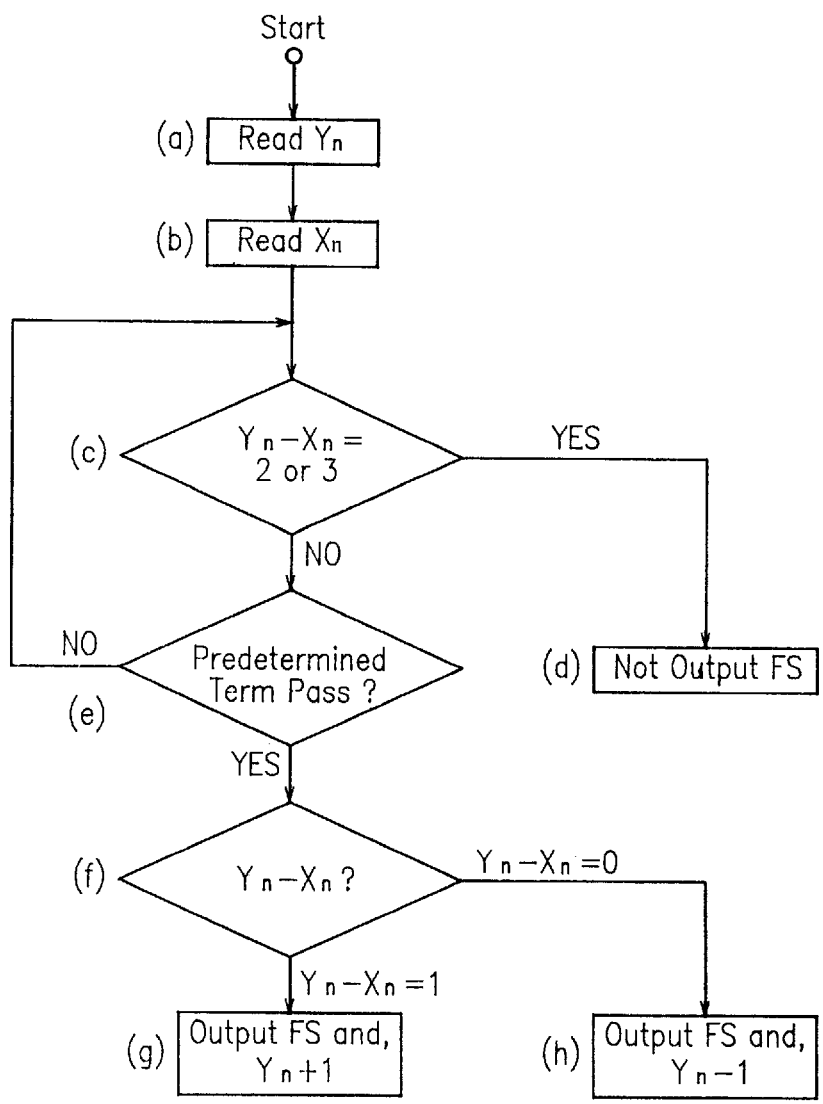
FIG. 32 is a flow chart depicting a computation flow executed in the embodiment of FIG. 31.

FIGS. 30(A) and 30(B) show examples of faults generated by a special circumstance. FIG. 31 shows an embodiment wherein the embodiment of FIG. 3 is improved to resolve the faults. FIG. 32 shows steps executed in the embodiment of FIG. 31.

As seen in FIG. 30(A), when the modulation factor "m" is small, that is, the amplitude of the vortex signals is small, and, for example, the vortex signal stays in the vicinity of the position where selection signal $Y_{n-1}$ is switched to $Y_n$, the waveforms cannot then be reproduced accurately, as described below. For example, as shown in FIG. 12(I), since there is a time shift between the instant in time for an input decision and the instant in time for phase detection in a practical signal processing, a slight change in the signal delay or frequency in the hardware causes a phase shift between the instant in time when the sequence is decided and the instant in time when the phase is actually detected. Disregarding the fact that it is necessary to execute processing after originally switching ($y_n$=1) by a selection signal, this occurs when the processing is executed before switching ($Y_{n-1}$=0), resulting in a waveform distortion, as shown in FIG. 30(B). The embodiment of FIG. 31, eliminates the foregoing problem.

In FIG. 31, phase pattern signal $X_n$ outputted from signal analyzer 33 is inputted to microcomputer 44. Selection signal $Y_n$ outputted by channel selector 35 is also supplied to the microcomputer 44. The foregoing problem is eliminated by microcomputer 44 outputting a forced switching signal FS to channel decider 35e (see FIG. 11) of channel selector 35 through execution of the computation procedure shown in the flow chart of FIG. 32, to forcibly execute switching to optimum selection signal $Y_n$.

The flow chart of FIG. 32 is premised on modulation factor "m" being computed and determined in microcomputer 44 using the computation expression shown in equation (7). Thus, factor "m" is assumed to be smaller than the specified value. In steps (a) and (b), CPU 44a reads the selection signal $Y_n$ and phase pattern signal $X_n$ into a predetermined area of memory 44b. In step (c), the difference between selection signal $Y_n$ and phase pattern signal $X_n$, $Y_n$-$X_n$ is computed to decide whether the difference is 2 or 3. A difference of 2 or 3 means that the phase signal is positioned around 25% to 75% of the available output span of the selection range (see FIG. 13).

If the result of the decision is "yes", forced switching signal FS is not outputted. (step (d)) because forced switching would not be necessary. If it is "no", the flow proceeds to step (e) where a decision is made as to whether the predetermined term has passed or not and where steps (c) and (e) are repeated, until the term has passed If the decision is "yes" in step (c), before the term passes, forced switching signal FS is not outputted (step (d)) because forced switching is not necessary. If the predetermined term has passed, the vortex signal is stagnant at the upper or lower end of the selection diagram (see FIG. 13). Thus, the signal is moved to be near the center by forced switching signal FS.

If the result of the decision in step (f) is $Y_n$-$X_n$=1, the vortex signal is positioned at the upper end of the selection diagram (see FIG. 13) and $Y_n$ is advanced by 1 (i.e. increased by +1) by outputting the forced switching signal FS to channel selector 35 in step (g). On the other hand, if $Y_n$-$X_n$=0, the vortex signal is positioned at the lower end of the selection diagram and $Y_n$ is moved back by 1 (i.e. subtracted by 1).

Accordingly, when a vortex signal of small modulation factor "m" has been stagnant for a predetermined time at the instant of switching selection signal $Y_n$, the vortex signal is prevented from becoming distorted by moving the signal to an adjacent selection signal to forcibly move the center point of operation, so that the signal is operated near the center of the selection diagram (see FIG. 13).

Figure 33:
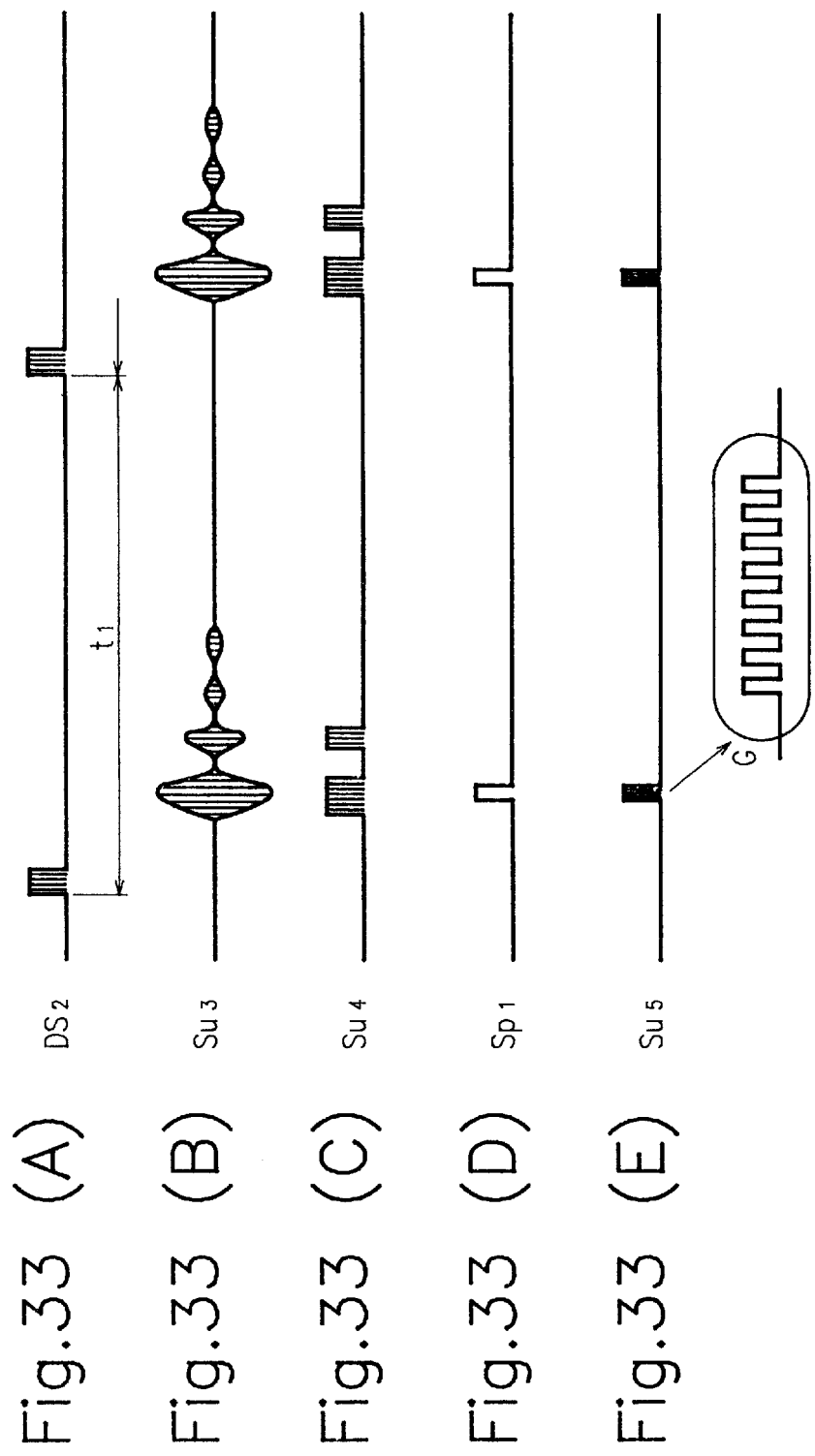
FIGS. 33(A)–33(E) are waveform diagrams depicting ultrasonic signals having missing pulses occurring in the embodiment of FIG. 20.

In the embodiment of FIG. 3, an error in which there are missing pulses in the received ultrasonic signals will now be described with reference to FIGS. 33(A)–33(E). As shown in FIG. 33(A), when drive signal DS$_2$ is applied to transmitter 12, ultrasonic waves are modulated by vortices in the measuring fluid and received as ultrasonic signal $S_{U3}$ using receiver 15 (see FIG. 33(B)) and are outputted as ultrasonic signal $S_{U5}$ after further being converted to pulses in pulse shaper 26 (see FIG. 33(C)) and sampled by sampling signal $S_{P1}$ in sampler 27.

The sample signal $S_{U5}$ includes pulse waves which are phase modulated by vortices, as shown in the enlarged part G of FIG. 33(E). However, if bubbles or other substances which obscure the ultrasonic waves occur in the pipe 13, all or part of the pulse waves may disappear. In such a case, if signal $S_{U5}$ is subjected only to normal vortex signal restoration by being sent to phase detectors 35a–32d without treatment, the output will be abnormal.

Figure 34:
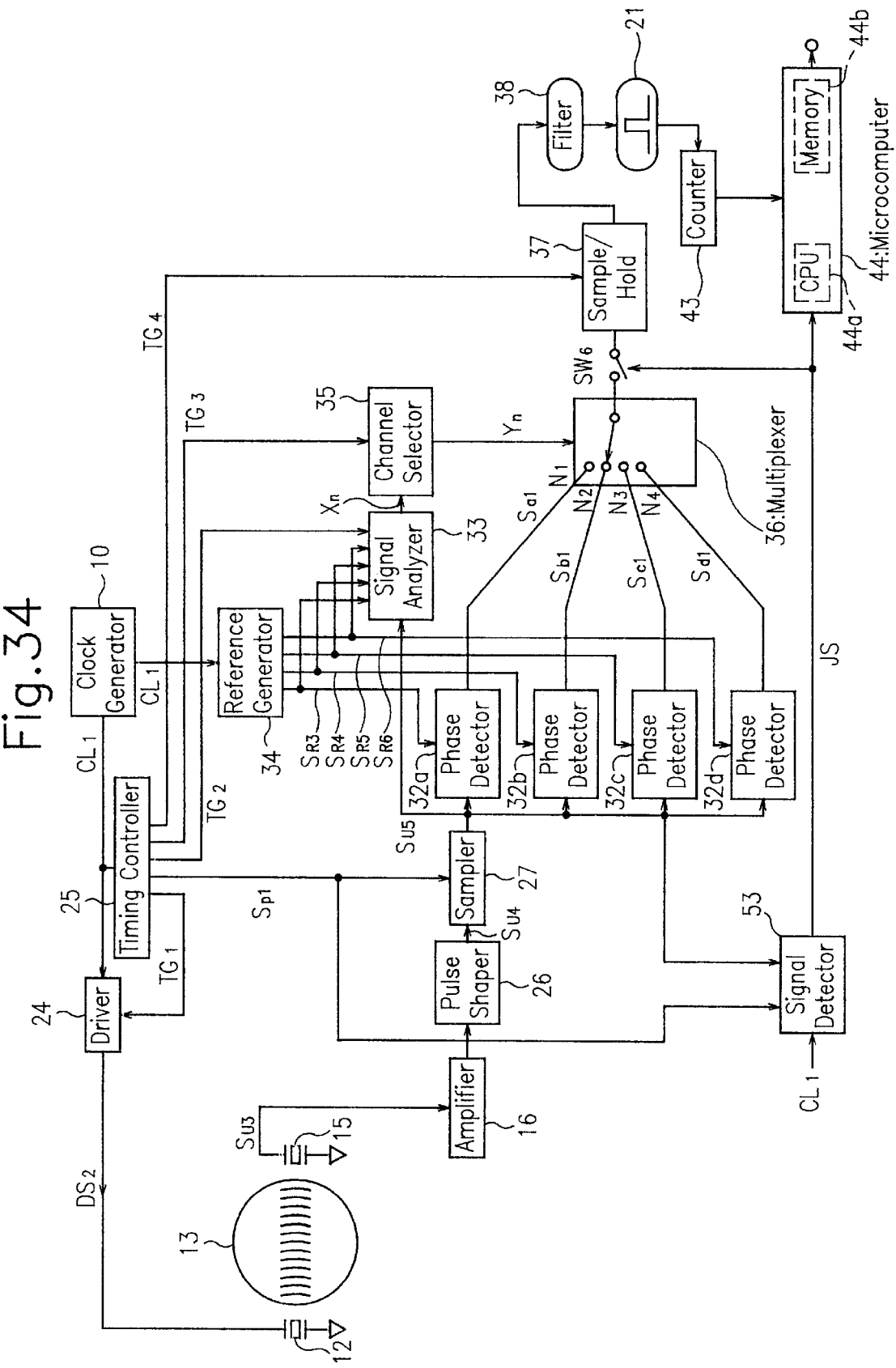
FIG. 34 is a block diagram depicting a tenth illustrative embodiment of the invention which solves problems shown in FIGS. 33(A)–33(E).

The foregoing abnormality is eliminated by the embodiment of FIG. 34, wherein signal detector 53, switch $S_{W6}$, are provided with switch SW$_6$ being disposed between multiplexer 36 and sample/hold circuit 37. Signal detector 53 receives reference clock CL$_1$ from clock generator 10, sampling signal $S_{P1}$ from timing controller 25 and signal $S_{U5}$, and detects whether the pulses are present or not during one cycle or more of the signal $S_{U5}$, as sampled by sampling signal $S_{P1}$ (see the enlarged part G of FIG. 33(E)).

As a result, abnormal vortex signals are prevented from being outputted by signal detector 53 outputting binary decision signal, for example, of level H when pulses are present and level L when pulses are not present, to switch SW$_6$ thereby to turn OFF switch SW$_6$ when level L is detected. The decision signal JS is also outputted to microcomputer 44 which holds the output by use of software. The microcomputer 44 outputs an alarm when the L level continues over a long period of time or causes burn out in the output using an incorporated program based on the decision signal JS, thereby to control output control.

Figure 35:
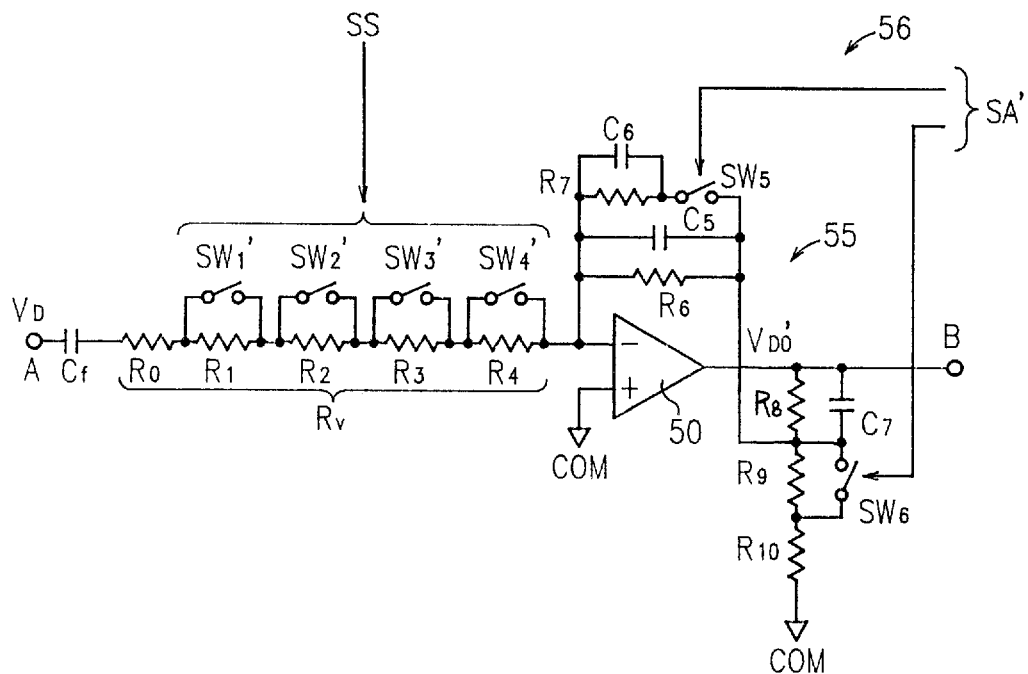
FIG. 35 is a circuit diagram depicting a filter which results from changing a part of the filter of FIG. 24.

FIG. 35 shows a filter circuit which is simpler than the filter of FIG. 24 by integrating filter 49 and variable gain amplifier 51. Negative feedback circuit 55 is provided across the input and output terminals of the operational amplifier 50 to provide filter 56 with a variable gain function. The FIG. 35 embodiment can be used in place of filter 49 of FIG. 23.

The negative feedback circuit 55 comprises resistors $R_6$–$R_{10}$, capacitors $C_5$–$C_7$, switch $SW_5$, and switch $SW_6$. Across the output terminal and inverted input terminal (−) of operational amplifier 5(0, a parallel circuit comprising resistor $R_6$ and capacitor $C_5$ is connected. Across this parallel circuit, a series circuit of switch $SW_5$ and a parallel circuit of resistor $R_7$ and capacitor $C_6$ are connected.

Between the output terminal of operational amplifier 50 and common potential point COM, resistors $R_8$–$R_{10}$ are connected in series and across resistor $R_8$, capacitor $C_7$ is connected in parallel. To the connection point of resistors $R_8$, $R_9$ and capacitor $C_7$, one end of switch $SW_5$ is connected and across resistor $R_9$, switch $SW_6$ is connected.

Figure 36:
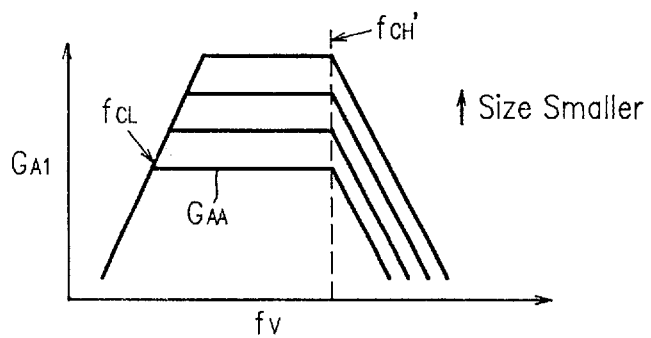

Resistor $R_v$ is selected with size switching signal SS similar to FIG. 24. However, since a capacitor corresponding to capacitance $C_v$ is not present, the circuit functions as fixed high cut filters. For this reason, as shown in FIG. 36, the higher frequency side corner frequency $f_{CH}'$ is a constant value regardless of whether it is of smaller size or larger size, that is being different from FIG. 25.

The gain $G_{AA}$ of filter 56 is switched by a combination of switches $SW_5$ and $SW_6$ and switching can be done in four steps depending on the combination of ON and OFF application of sound velocity adjustment signal SA'. Accordingly, providing a gain variable function for operational amplifier 50 eliminates the necessity of providing variable gain amplifier 51, as shown in FIG. 24. Thus, the number of components is reduced.

The invention provides many advantages, some of which are listed below in terms of the features disclosed in the different claims which are appended hereto.

The invention, for example, provides stable reproduction of vortex signals even when the phase changes exceed 2π because more than one phase detection means is switched automatically. Accordingly, vortex signals can be stably detected when measuring fluids under varying conditions, such as when using large sized metering pipes, fast flowing velocity fluids, or low sound velocity gases. Thus, advantageously, the invention can be used in a wide range of applications.

In addition, since the phase detection is switched automatically, even when the initial phase varies with the change in sound velocity for the measuring fluid and the entire phase change exceeds 2π, stable vortex detection is possible even when the initial phase is in the vicinity of 0 or 2π.

The invention for example, provides a simplified circuitry by using only one phase detection means.

The invention uses intermittent ultrasonic waves so that, advantageously, noise is separated and rejected.

The invention uses a transient state of burst waves so that, advantageously, the number of burst waves is reduced and the reverberation is reduced, noise is reduced, and power consumption is reduced.

The invention for example, define a different configuration, but, advantageously, enjoys substantially the same effects and advantages thereof.

The invention, for example, advantageously sets the sampling signal to an appropriate position using a sound velocity measured for the measuring fluid and does not overlook vortex signals due to shift in the gate position even when the sound velocity changes greatly.

The invention, for example, advantageously uses a simple circuit to switch the corner frequencies of the bandpass filter using a size switching signal for different sizes so that the waveform shaping of vortex signals can be readily provided whereby the bandwidth of bandpass filter becomes an equal flow velocity range for each size.

The invention, for example, omits the variable capacitor switching and uses a fixed high cut filter so as to provide substantially the same effect as claim 12 using a simplified circuit.

The invention, for example, enables the output signal of the bandpassfilter independent of the size thereof and variable dependent on the flow velocity and sound velocity so that waveform shaping is independent of sound velocity changes, by compensating the gain of a variable gain amplification means with a sound velocity adjustment signal.

The invention, for example, encompasses a filter having a variable amplification function with reduced number of components while providing a substantially similar effect to the previously discussed feature.

The invention, for example, provides a switch which is closed for a short time using a switching signal thereby to prevent loss of measurement during an abrupt voltage change at the instant of switching.

The invention, for example, use a circuit wherein a forced switching signal switches the selection signal forcibly is outputted to the channel Selector when the modulation factor is small and the phase pattern signal is stagnant for a predetermined period about the switching instant for the selection signal thereby to accurately restore the vortex signal even when the vortex signal is stagnant for a long period of time in the vicinity of the switching point when the selection signal is switched.

The invention, for example, uses a circuit wherein absence of pulses during one cycle is detected by a detection circuit and a decision signal is outputted, so that advantageously, stable measurement is obtained without causing pulse disappearance wherein bubbles or other obscuring substances occur.

The invention, for example, controls the incorporated program output, such as holding of a signal, or an output alarm, by using a computational method when the decision signal is inputted so that output abnormality is readily detected.

The foregoing description is illustrative of the principles of the invention. Numerous extensions and modifications thereof would be apparent to the worker skilled in the art. All such extensions and modifications are to be considered to be within the spirit and scope of the invention.

What is claimed is:

1. A vortex flowmeter comprising:
    a reference signal generating means for providing a plurality of reference signals of different phases;
    signal analyzing means for providing an input status signal by determining relationship between phases of ultrasonic signals applied to a measuring fluid and each of said reference signals;
    phase detection means for providing phase signals by detecting phase differences between said ultrasonic signals and said reference signals;
    channel selection means for selecting an optimum one of said phase signals using said input status signal and for providing said optimum phase signal as a selection signal; and
    means for computing and providing flow rate signals using said selection signal.

2. A vortex flowmeter comprising:
    reference signal generating means for providing a plurality of reference signals of different phases;
    signal analyzing means for providing an input status signal by determining relationship between phases of ultrasonic signals applied to a measuring fluid and each of said reference signals;

channel selection means for providing a selection signal by selecting an optimum one of said reference signals using said input status signal;

phase detection means for providing a phase signal by detecting phase difference of said ultrasonic signal based on said one reference signal selected as said selection signal; and means for computing and providing flow rate signals using said phase signal.

3. The flowmeter of claim 1, further comprising:

means for providing burst waves as drive signals for applying said ultrasonic signals to said measuring fluid; and sampling means for sampling part of said burst waves.

4. The flowmeter of claim 2, further comprising:

means for providing burst waves as drive signals for applying said ultrasonic signals to said measuring fluid; and sampling means for sampling part of said burst waves.

5. The flowmeter of claim 3, wherein said sampling means comprises means for determining a sampling point before said burst waves reach a steady state value.

6. The flowmeter of claim 4, wherein said sampling means comprises means for determining a sampling point before said burst waves reach a steady state value.

7. The flowmeter of claim 1, further comprising:

sample/hold means:

means for providing said input status signal and said phase signal as numerical data specialized with a plurality of phase patterns and as pulse width data, respectively; and wherein said channel selection means comprises means for selecting a pulse width data using said numerical data and for providing the selected pulse width data to said sample/hold means; and wherein said sample/hold means restores vortex signals and provides the restored vortex signals as flow rate signals.

8. A vortex flowmeter comprising:

driver means for driving an ultrasonic transmitter means based on a reference clock;

ultrasonic receiver means for receiving modulated ultrasonic waves provided by vortices from ultrasonic signals applied by said transmitter means to a measuring fluid and for providing said modulated ultrasonic waves as ultrasonic output signals;

reference signal generating means for generating a plurality of reference signals of different phases based on said reference clock;

sampling means for sampling part of said ultrasonic output signals;

signal analyzing means for providing an input status signal by determining relationship between phases of an output signal from said sampling means and each of said plurality of reference signals;

a plurality of phase detection means for providing phase signals by detecting phase differences between said ultrasonic output signals and said reference signals;

channel selection means for selecting an optimum one of said phase signals using said input status signal; and means for computing and providing flow rate signals using said selected optimum phase signal.

9. A vortex flowmeter comprising:

reference signal generation means for providing a plurality of reference signals of different phases;

signal analyzing means for providing an input status signal by determining relationship between phases of ultrasonic signals applied to a measuring fluid and each of said plurality of reference signals;

phase detection means for providing phase signals by detecting phase differences between said ultrasonic signals and said plurality of reference signals;

sample/hold means for receiving said phase signals;

means for causing said sample/hold means to supply a plurality of hold signals;

channel selection means for selecting an optimum hold signal using said input status signal; and means for computing and providing flow rate signals using said selected optimum phase signal.

10. A vortex flowmeter comprising:

driver means for continuously driving an ultrasonic transmitter based on a reference clock;

ultrasonic receiver means for receiving modulated ultrasonic waves resulting from ultrasonic signals applied by said transmitter means to a measuring fluid and acted upon by vortices and for providing said modulated ultrasonic signals;

sampling means for sampling part of said modulated ultrasonic signals;

reference signal generating means for generating a plurality of reference signals of different phases based on said reference clock;

signal analyzing means for providing an input status signal by determining relationship between phases of an output signal from said sampling means and said plurality of reference signals;

phase detection means for providing phase signals by detecting phase differences between said output signal and said plurality of reference signals;

channel selecting means for selecting an optimum one of said phase signals using said input status signal; and means for computing and providing flow rate signals using said selected phase signal.

11. The flowmeter of claim 1, further comprising:

timing controller means for receiving a first control signal, providing drive signals based on said first control signal, receiving signals subjected to changes in propagation time due to Karman vortices, providing said signals subjected to Karman vortices as received signals, and providing a sampling signal by a second control signal; and computation means for computing sound velocity using time difference between providing of said first control signal and reception of said received signal, said second control signal being provided by computing the instant of time at which said sampling signal is raised based on said sound velocity and from using a signal sampled by said sampling signal as said ultrasonic signal.

12. The flowmeter of claim 1 further comprising:

filter means comprising an operational amplifier, a variable resistor connected to an input terminal of said operational amplifier, a variable capacitor connected to a negative feedback circuit of said operational amplifier, size switching means for switching said variable resistor and said variable capacitor with a size switching signal so that the values thereof are proportional to meter size;

computation means for computing said size switching signal corresponding to said meter size; and means for applying said phase signal to an input terminal of said filter means and for providing said flow rate signal corresponding to an output signal from said filter means.

13. The flowmeter of claim 1, further comprising:

filter means comprising an operational amplifier, a variable resistor connected to an input terminal of said operational amplifier, a negative feedback circuit connected between an input terminal and an output terminal of said operational amplifier;

means for switching said variable resistor with a size switching signal so that the value thereof is proportional to meter size;

computation means for computing said size switching signal corresponding to said meter size;

means for applying said phase signal to an input terminal of said operational amplifier; and means for providing said flow rate signal corresponding to an output of said filter means.

14. The flowmeter of claim 12, further comprising:

a variable gain amplification means having gain changed by a sound velocity adjustment signal; and wherein said computation means comprises means for computing said sound velocity adjustment signal to compensate for changes in sound velocity, and means for providing said flow rate signal corresponding to an outputs signal of said variable gain amplification means.

15. The flowmeter of claim 13, wherein said filter means comprises means for providing a phase demodulation signal whose value is changed by said negative feedback circuit being switched by a sound velocity adjustment signal; and wherein said computation means comprises means for computing said sound velocity adjustment signal to compensate for changes in sound velocity.

16. The flowmeter of claim 1, further comprising:

filter means comprising
  an operational amplifier,
  a capacitor,
  a variable resistor, said capacitor and said variable resistor being connected in series to an input terminal of said operational amplifier, and
  a variable capacitor connected to a negative feedback circuit of said operational amplifier, switch means connected between a connecting point connecting said capacitor and said variable resistor and a common potential point;

means for operating said switch means for a short time;

computation means for providing a switching signal to said means for operating in response to a selection signal provided by said channel selection means when a modification factor indicating required phase change is small;

means for applying said phase signal to said input terminal; and means for providing said flow rate signal using output from said filter means.

17. The flowmeter of claim 1, further comprising:

computation means for receiving said selection signal and said input status signal as a phase pattern signal, and for providing a switching signal to said channel selection means when said phase pattern signal is stagnant for a predetermined period about a switching point for said selection signal, and further comprising means for providing a forced switching signal to switch said selection signal by force.

18. The flowmeter of claim 1, further comprising:

signal detector means for providing a decision signal when said signal detector means detects when there is no pulse during at least one cycle in said ultrasonic signal using a reference clock and a sampled ultrasonic signal from a part of burst waves resulting from signals applied to a measuring fluid; and holding means for holding an output signal from said channel selection means in a state before detection with said decision signal.

19. The vortex flowmeter of claim 18, further comprising: computation means for controlling output based on an incorporated program when said decision signal is received.

* * * * *